United States Patent [19]
Yevick

[11] 4,110,014
[45] Aug. 29, 1978

[54] PARALLEL AND SERIES ELECTRO-OPTIC VIEWING AND RECORDING APPARATUS

[75] Inventor: George J. Yevick, Leonia, N.J.

[73] Assignee: Izon Corporation, Stamford, Conn.

[21] Appl. No.: 735,030

[22] Filed: Oct. 22, 1976

[51] Int. Cl.² .............................................. G02F 1/13
[52] U.S. Cl. ................................... 350/342; 350/347; 350/357; 350/360; 250/213 R; 358/61; 358/62
[58] Field of Search ............ 350/150, 160 R, 160 LC, 350/161 S; 250/213 R; 96/1 R, 1 PC, 1.5; 358/61, 62

[56] References Cited
PUBLICATIONS

Flannery: "Light controlled Light Valves," IEEE Transactions on Electron Devices, vol. ED-20, pp. 941-953, Nov. 1973.

Primary Examiner—Edward S. Bauer
Attorney, Agent, or Firm—Thomas J. Greer, Jr.

[57] ABSTRACT

An electro-optic device having utility in (a) the display of parallel information such as a projected microimage, and (b) both the display and recording of series information such as TV signals. The device includes a photoconductive sheet and an electro-optic sheet (and may also employ a gravure lattice member) and carries X and Y addressors.

34 Claims, 44 Drawing Figures

PARALLEL AND SERIES ELECTRO-OPTIC VIEWING AND RECORDING APPARATUS

This invention relates to an apparatus for displaying information stored in the form of microimages and also for presenting and recording time-sequential information such as TV signals.

In the following description of the invention the adjective — parallel — will denote information which is simultaneously displayed. Thus, the projection onto a viewing screen of a microimage carried by a photographic emulsion is parallel because it is the simultaneous presentation of many tens of thousands of information bits onto a viewing screen. Conversely, the adjective — series — will denote information which is sequentially given. Thus, the striking of a phosphor coating on a TV receiving tube by an electron beam is series because it is a sequential scanning or traversins of the tube's area, the scanning requiring a finite time to generate a complete image.

This invention, in some of its embodiments, is an improvement on that described in my copending application Ser. No. 812,811 which is a continuation of abandoned application ser. No. 680,488 filed Apr. 26, 1976, entitled Light Amplification Device, hereby incorporated by reference. In this copending application, I have described a method of improving the operation of light amplifiers. That method involves the use of lattice points, termed gravure lattice points because of their similarity to the technique of gravure printing. The lattice points reduce the power requirements of a particular type of light amplifier. In that type of light amplifier, information in the form of a reduced image on a film is projected and amplified for viewing on a screen.

According to the practice of this invention, gravure or lattice points may be employed with optical apparatus which both records and displays series information. Examples of the sequential presentation of information, i.e., series information, are afforded by television receivers, telephone facsimile receivers, and computer output. The advantages of gravure lattices are thus realized in the presentation of series data. It will be understood, however, that the presence of gravure lattice points is not essential for the practice of the invention.

Further, in accordance with the practice of this invention, series information may be recorded for subsequent viewing in the parallel mode.

The present invention employs X and Y addressors of generally known construction and operation although other addressings, such as hexagonal, are possible. Such addressors are employed in the television display art and include switching apparatus coupled to a plurality of transparent, conductive strips separated from each other such that each strip may assume its own electrical potential. The X addressor strips are positioned at right angles to the Y addressor strips, each such set of strips defining and lying in its own plane, each set sandwiching an electro-optical sheet or laminate. The electro-optical sheet or laminate undergoes a change in an optical property when locally impressed by an electric field. By sequentially applying various electrical potentials to the strips of each X and Y set, the equivalent of a TV picture tube raster is formed. X and Y addressors and their use in TV display devices are illustrated, for example, in the following U.S. Pat. Nos. 3,947,721 to Suenami; 3,837,730 to Hatfield; 3,925,703 to Schermerhorn, and 3,612,758 to Evans. The X and Y addressor circuits are coupled to conventional series information sources, such as a TV receiving system. In this manner, series information is viewed. In several embodiments of this invention, the electro-optic medium may transmit light in two directions, one for viewing and the other for recording. In another mode of operation, the parallel mode, the addressor strips of each set carry the same potential and the device functions as a parallel light amplifier of the type described in my noted copending application.

IN THE DRAWINGS

Figure 1:
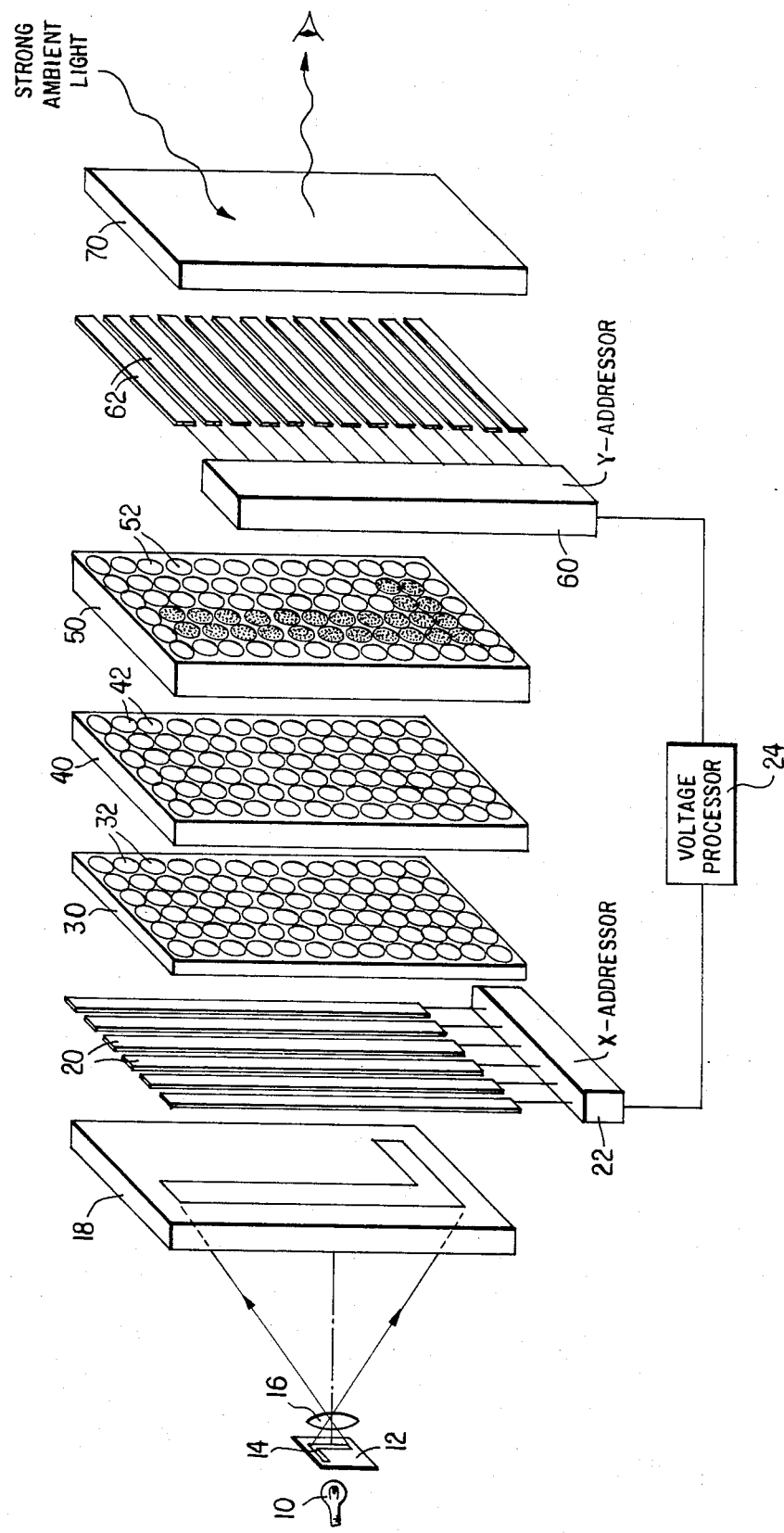
FIG. 1 is a partially schematic exploded view of the device of this invention according to one embodiment and is shown as operating in the parallel mode.

Referring now to FIG. 1 of the drawings, the numeral 10 denotes a source of illumination such as an incandescent light. The numeral 12 denotes a transparency which carries, for example, the letter L denoted by the numeral 14. The numeral 16 denotes a positive lens which projects a real image from transparency 12 onto dielectric sheet 18. The numeral 18 denotes a thin transparent dielectric sheet, for example, glass or plastic, and is intended to provide mechanical support for vertically extending transparent and conductive X addressor strips 20. Strips 20 are electrically coupled to X addressor 22. The numeral 30 denotes a substrate in the form of a dielectric sheet provided with a plurality of photoconductors 32 each in the form of a plug or short cylinder embedded in the dielectric medium. Each photoconductor 32 has the property that its electrical resistance substantially decreases when subject to light. The numeral 40 indicates a dielectric substrate in sheet form which carries a plurality of metallic conductors 42, each in the form of a plug or short cylinder also embedded in dielectric medium 40. Substrate 40 and conductors 42 are opaque and the ends of the conductors are given an optical finish which may be, for example, specular, diffuse white, black, colored, or other finish which confers upon it a desired appearance and optical property depending on the electro-optical medium utilized. The numeral 50 denotes a substrate in a form of a dielectric sheet which carries cavities 52 of short cylindrical form filled with an electro-optic material. Such material has the properties that when subjected to an electrical field, its optical quality, for example, or color changes. Plugs 32, 42, and cavities 52 are optically aligned. The numeral 60 denotes a Y addressor coupled to transparent and conductive strips 62 which strips are spaced from each other. Strips 20 and 62 are of identical construction. The numeral 70 denotes a transparent dielectric sheet similar to sheet 18. Sheets 18 and 70 mechanically support the sandwich comprising all elements between 18 and 70.

The moe of operation of the device shown at FIG. 1 is as follows. Assume the letter L to be projected from a transparency in the manner indicated, the light passing through lens 16 and therefore appearing in magnified form on transparent dielectric 18. Addressors 22 and 60 are maintained at a different potential to thereby establish and maintain a unidirectional electric field across elements 30, 40 and 50. It will be understood that all of the strips 20 of addressor 22 are of the same potential. Similarly, all of the strips 62 of addressor 60 are maintained at the same potential for this mode. The magnified image of the object 14 on sheet 18 falls on photoconductors 32. Those plugs 32 which lie within the outline of image 14 (the letter L) increase their electrical conductivity due to the well known action of light on such materials. Accordingly, the electrical field which has been maintained by elements 22 and 60 increases across those electro-optic cells 52 which are aligned with corresponding photoconductors 32 and conductors 42. This will cause a change in the optical state, for example, from opaque to transparent, or from one color to another, or from transparent to opaque of those electro-optic cells. Ambient light falling on transparent plate 70 is accordingly modulated, for example, by absorbtion in, or reflection from, opaque cells 42 according to the varying optical properties of corresponding electro-optic cells 52, with the result that the viewer (indicated by the human eye) sees the magnified image of 14. The reader will note the stippled cylinders 52 on substrate 50 which illustrates this action.

The transparency 12 may assume the form of a continuous photographic film for animation purposes having microimages thereon, which film may, for example, be mounted in and carried by a Philips type cassette. It will be further understood that the potential between the addressors 22 and 60 is maintained by an electrical system denoted by the numeral 24. The construction of such a system is well known to workers in the art and is accordingly not set out.

Figure 2:
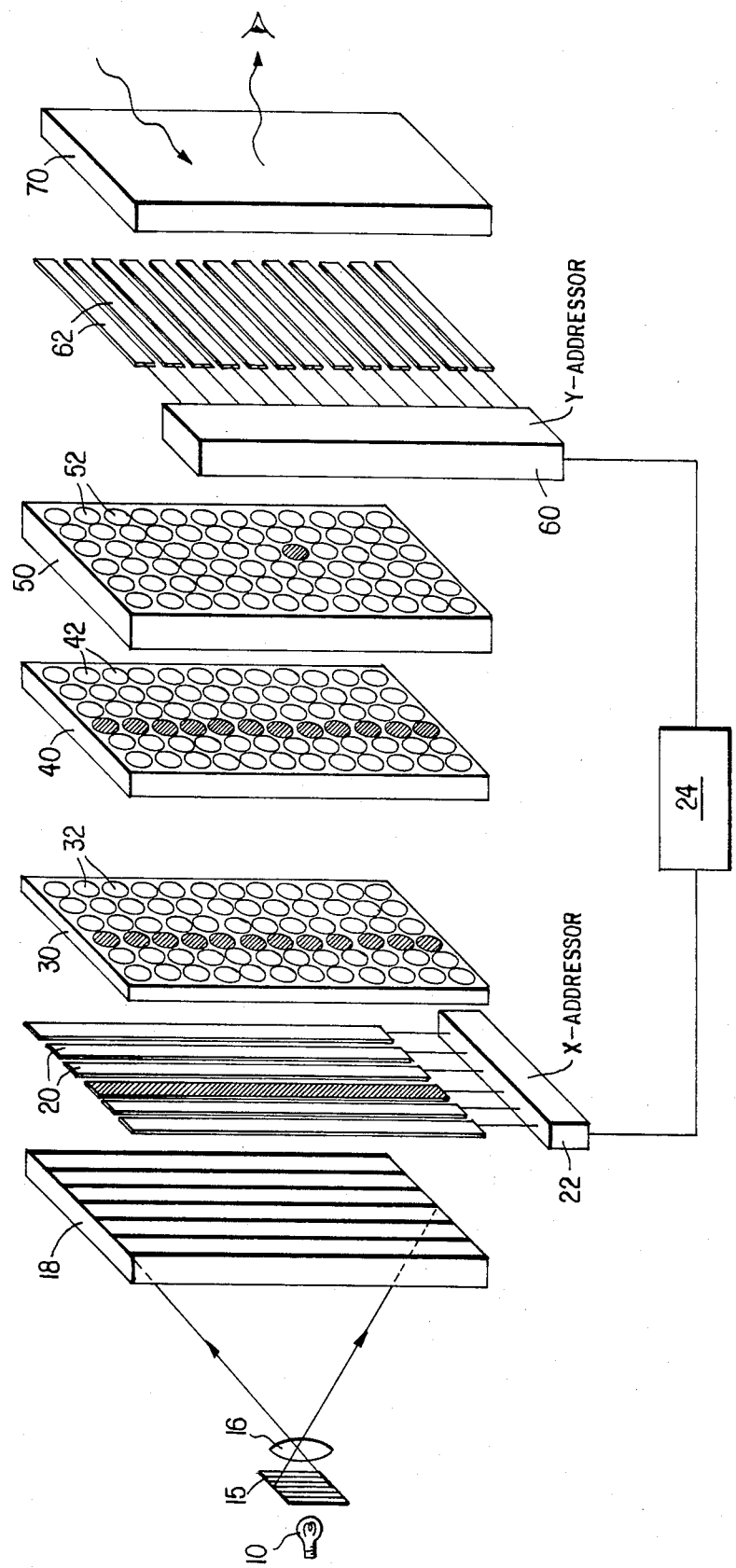
FIG. 2 is a view similar to FIG. 1 and shows the device of FIG. 1 when operated in the series mode.

Referring now to FIG. 2 of the drawings, the operation of the elements of FIG. 1 when employed as a television viewer (series mode) will now be given. Instead of a transparency 12 carrying information, a transparency 15 carrying a grid of parallel, vertical opaque lines spaced from each other is employed. Transparency 15 is then projected by a suitable optical system 16 to define a grid on transparent dielectric sheet 18. The vertical and opaque grid lines projected on sheet 18 are coincident with the spacings or gaps between vertically extending addressor strips 20.

The function of the projected grid light is as follows. Without light shining on plate 18 to thereby activate photoconductors 32, the photoconductors would be inert and function as insulators and, therefore, any applied signals to the X-addressors would not activate the electro-optic media 52.

With this explanation, the reader will understand that when the photoconductor material is in the form of vertically patterned, discrete element, the lines defining the grid are not essential. However, should the photoconductor material be of continuous form, such as a sheet, the grid lines would be essential to prevent electrical coupling between the conductive X-addressor strips.

Voltage processor 24 (for the television viewing mode) is suitably coupled to a television signal receiving system such that X and Y addressors 22 and 60, respectively, are activated so that vertical strips 20 and horizontal strips 62 are sequentially energized by elctrical potentials, all in a manner well known in the art. For example, if vertical strip $X_3$ and horizontal strip $Y_5$ are simultaneously energized, one of the photoconductor plugs 32 and associated conductor plug 42 and associated electro-optic cell 52 is similarly activated, as indicated by the hatched cell 52. Thus, the viewer looking at the transparent dielectric sheet 70 sees ambient light modulated to define an image.

Figure 3:
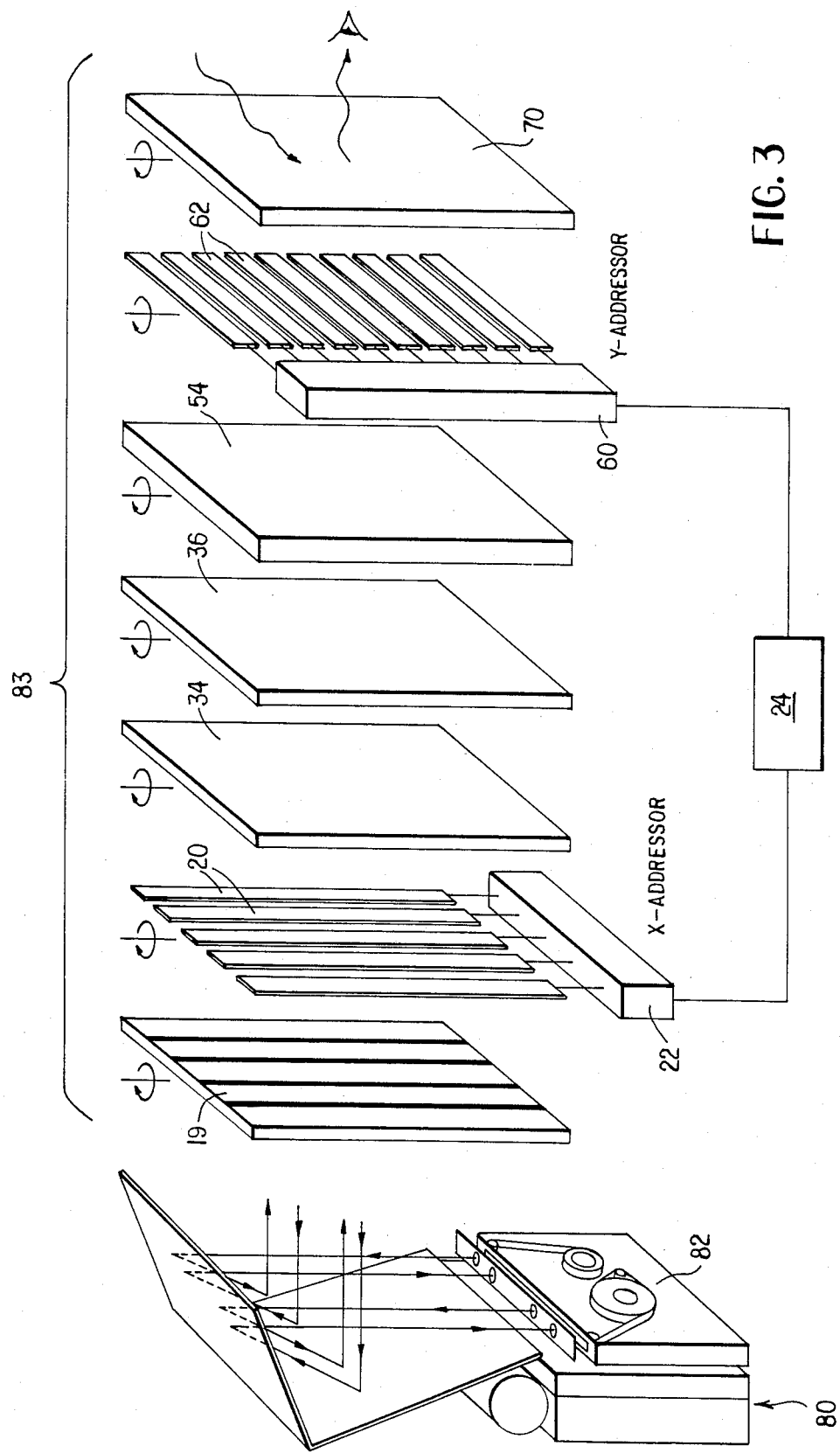
FIG. 3 is a partially schematic view of another embodiment of a light amplifier for series and parallel viewing and for series recording.

Referring now to FIG. 3 of the drawings, an embodiment of the invention is illustrated which is capable of both viewing parallel information in the form of microimages and for viewing series information. The numeral 19 indicates a transparent dielectric sheet with opaque stripes. The opaque strips electrically isolate the conducting strips 20 with respect to each other. Otherwise, the photoconductor 34 everywhere becomes conducting and would couple electrically the addressor strips 20 thereby rendering the device inoperative in the series viewing mode. Sheet 19 is suitably illuminated from the left. The numeral 34 denotes a sheet formed from photoconductive material and is the same material, for example, from which plugs 32 of FIG. 2 are fashioned. Thus, photoconductor sheet 34 has the property that its electrical resistivity changes at whatever regions thereof are subject to visible light. The numeral 36, e.g., denotes an opaque dielectric, black, or white, or dielectric mirror depending upon the nature of electro-optic material 54. The numeral 54 denotes a plate formed on an electro-optic medium, such as the medium will fills cells 52 of the embodiment of FIG. 2. Numeral 70 again indicates a transparent dielectric sheet.

Transparent dielectric sheets 19 and 70 serve the function of mechanically supporting addressor transparent strips and the sheets therebetween. For the viewing of parallel information, the parallel information is directed towards the left of transparent sheet 19. The mode of operation is now essentially the same as that described with respect to the embodiment of FIG. 1. The reader will observe that the opaque portions of sheet 19 which together with photoconductor 34 electrically isolate conducting strips 20, coincide with the gaps between strips 20 of addressor 22.

To use the device of FIG. 3 for series information, the device is employed in the same manner as that with respect to the embodiment of FIG. 2.

The embodiment shown at FIG. 3 may also be employed for the recording of time sequential information, such as television signals. It is only necessary now to rotate by 180 degrees the composite sandwich defined by elements 19, 20, 36, 36, 54, 62 and 70, the sandwich defining a laminate 83. Strong and uniform ambient light, now falling on the face of sheet 19, passes through the transparent X addressor strips 20 and strikes photoconductor 34 to thereby render photoconductor 34 into conducting strips coincident with X-addressor strips. As the X and Y addressing voltages are applied by system 24, an information frame is spelled out or defined. Light emanating from a lamp not shown in device 80 is directed against sheet 70 and passes onto electro-optic medium 54. The combination of electro-optic medium 54 and opaque dielectric 36 causes light to be reflected or scattered back to a strip of film. When a film frame has been completely recorded, the film is stepped a slight amount in order to expose a fresh quantity. Such stepping and synchronization are known to those versed in the art and are not described. The reader will observe that opaque layer 36 is outside of the electro-optic layer 54 and accordingly protects it against bright ambient light when recording the time-sequential information.

Figure 5:
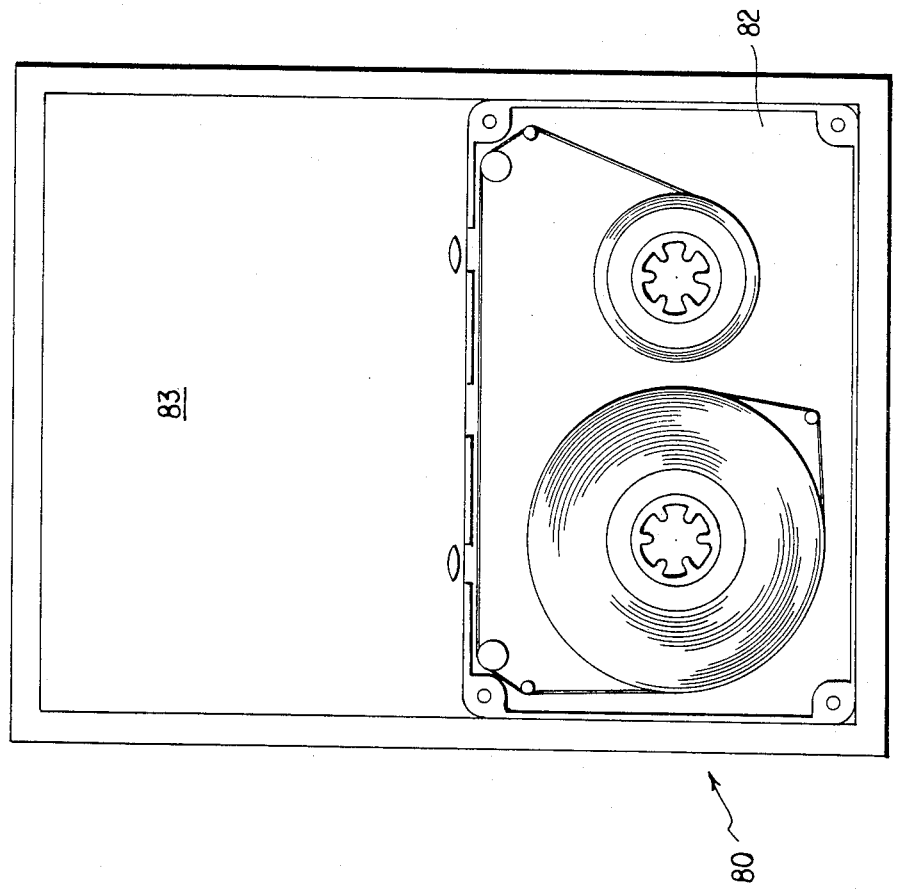
FIG. 5 is a partially schematic elevational view of the optical apparatus of FIG. 4.
Figure 4:
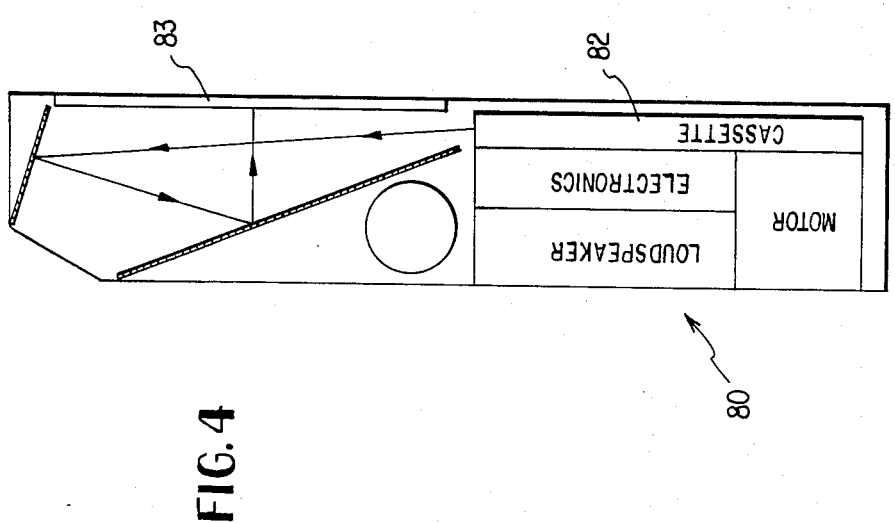
FIG. 4 is a partially schematic transverse cross-sectional view of an optical apparatus which includes the laminate shown at FIG. 3.

FIGS. 4 and 5 show an example of how the several sheets 83 of FIG. 3 are combined to form a compact, hand held electro-optic device. The numeral 80 denotes the overall device which employs a Philips cassette having virgin film for recording series informatiom or having developed film for viewing parallel information. The numeral 83 denotes the laminate of the several sheets 19–70 of FIG. 3, the laminate 83 being positioned in the hand held recorder/viewer as shown at FIGS. 4 and 5.

Figure 6:
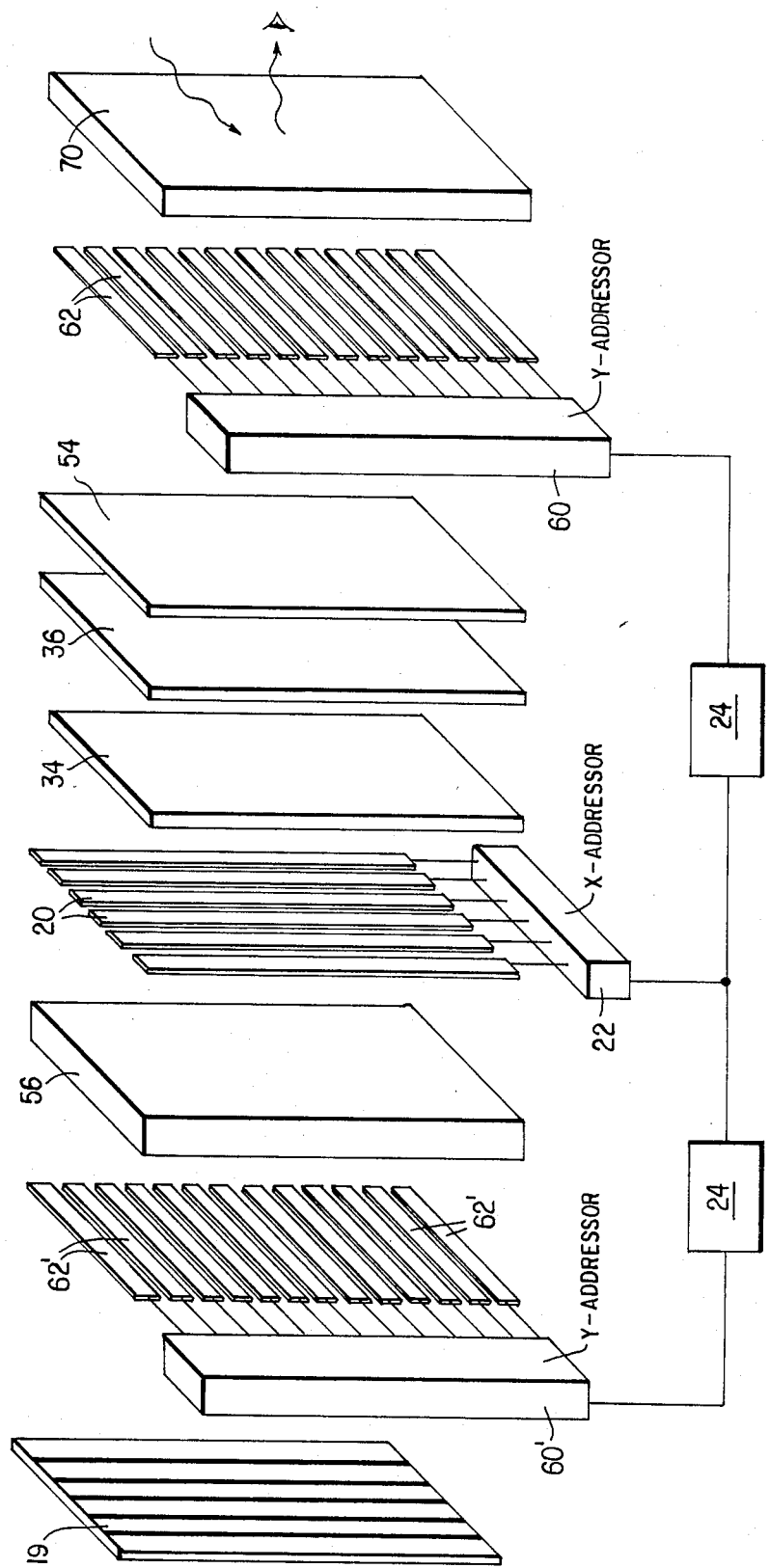
FIG. 6 is a view similar to FIG. 1 and illustrates another embodiment of the invention capable of parallel and series viewing and simultaneous series viewing and recording.

Referring now to FIG. 6 of the drawings, another embodiment is illustrated which exhibits the same capabilities of the embodiment as shown at FIG. 3 as well as the additional capability of simultaneously recording time sequential information while such information is being viewed. Referring now to FIG. 6, the numerals 19, 22, 34, 36, 54, 60 and 70 perform the same functions in the display of time sequential information as those previously described with respect to these elements shown at FIG. 3. To obtain the new function of recording while elements 60' and 56 to the left of the X addressor 22. Thus, when a time sequential signal, such as a television signal, is not being optically recorded, the new Y addressor strips 62' of addressor 60' play no role nor is any role played by element 56. For this to be true, the electro-optic medium 56 in its off-state must be clear. When, however, simultaneous recording of the time sequential information is desired, unmodulated light from the left of sheet 19 falls on the sheet, passes through strips 62', electro-optic medium 56 which is clear everywhere except at one spot, strips 20 and falls on photoconductor 34 and opaque white scattering sheet or dielectric mirror 36. Light passing through the said layers and scattered or reflected back from sheet 36 is modulated both when entering and leaving by the action of the addressor strips 62' and 20 on electro-optic medium 56, with the result that light modulated according to the desired pattern now passes out, towards the left of sheet 19 and onto virgin film for recording. The observer can view simultaneously a TV program on one channel and record another program on another channel by addressing differently 60' and 60.

Figure 7:
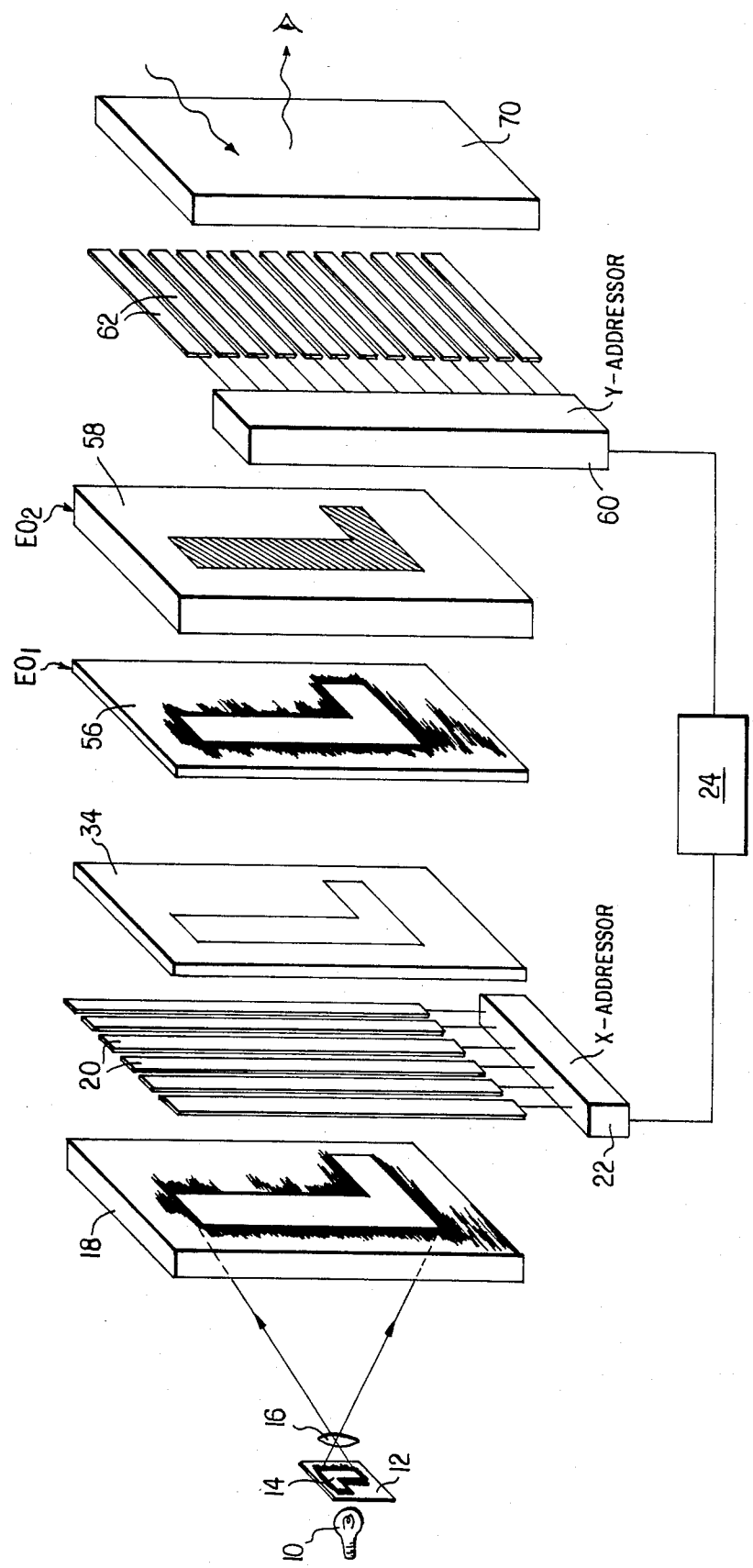
FIG. 7 is a view similar to FIG. 1 and illustrates another embodiment having two different types of electro-optic media.

Referring now to FIG. 7 of the drawings, another embodiment is described which can be used for both parallel and series viewing, as well as for series recording. Assume now that the parallel mode is employed and a microfiche or other transparency 12 is projected onto dielectric sheet 18. This light passes through transparent strips 20 of X addressor 22 and strikes photoconductor sheet 34. The numeral 56 denotes a sheet of normally opaque electro-optical sheet of a first kind, designated as $EO_1$, while the numeral 58 denotes a parallel and adjacent sheet of electro-optical sheet of a second kind, denoted by $EO_2$. With no electric field across it, sheet 56 is normally opaque but becomes clear when an electric field is impressed. Sheet 58 is normally of one color, for example clear, and changes to another color, for example red, upon the application of an electric field across it.

With a uni-directional field applied across the elements 34, 58 and 58 as before described, ambient light striking the right face of sheet 70 will be modulated by the letter L, as illustrated, and the observer's eye will perceive a red L on a background whose color depends on the undisturbed state of 56. The reader will note that the background in the normal state, i.e., little or not electric field applied across sheet 56, prevents ambient light from reaching photoconductor 34 and thereby precludes the generation of cross-talk or noise. In the parallel viewing mode, the allowable level of ambient light must be maintained below the level at which it would give rise to such positive feedback among the elements 34, 56 and 58 which feedback would result in spreading of the image into a uniform appearance.

Figure 8:
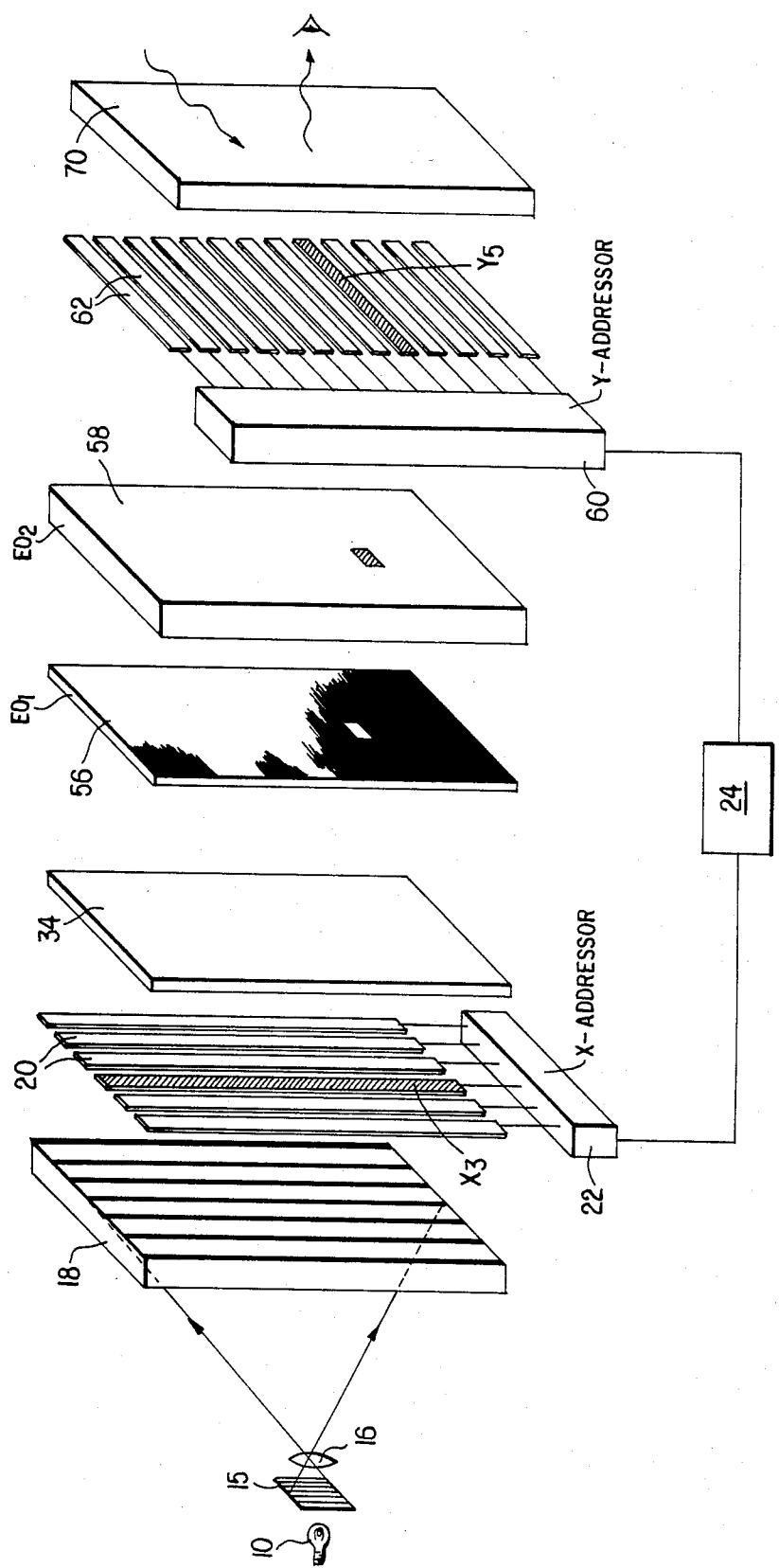
FIG. 8 is a view of the device of FIG. 7 and illustrates the series mode for viewing.

Referring now to FIG. 8 of the drawings, the mode of operation of the apparatus of FIG. 7 for series viewing will now be described. As in the embodiment of FIG. 2, a transparency 15 is projected so as to define a vertical grid on sheet 18, the opaque portions coinciding with the gaps between X vertical strips 20. The addressors 22 and 60 now receive electrical signals from system 24, the signals corresponding to the time sequential information to be displayed. When no electrical activating fields are imposed by the addressors, the observer, for example, perceives black when viewing sheet 70 if sheet 56 is normally black with little or no electrical field applied. If now a signal or potential pulse from the addressor is applied to the strips, regions of sheet 56 will become clear while corresponding regions of sheet 58 will change color with the result that ambient light falling upon sheets 58 and 56 will be modulated and the human eye will perceive a scene. Thus, referring to FIG. 8, assume that vertical strip $X_3$ of X addressor is activated by the addressor with a suitable potential at a given instant of time and that, simultaneously, horizontal strip $Y_5$ is electrically activated. The intersection of these two strips is denoted at FIG. 8 by a small rectangle in sheet 56 and by a small shaded rectangle in sheet 58. This is given by way of illustration only, the manner of sequentially addressing the strips 20 and 62 being known in the art.

Figure 9:
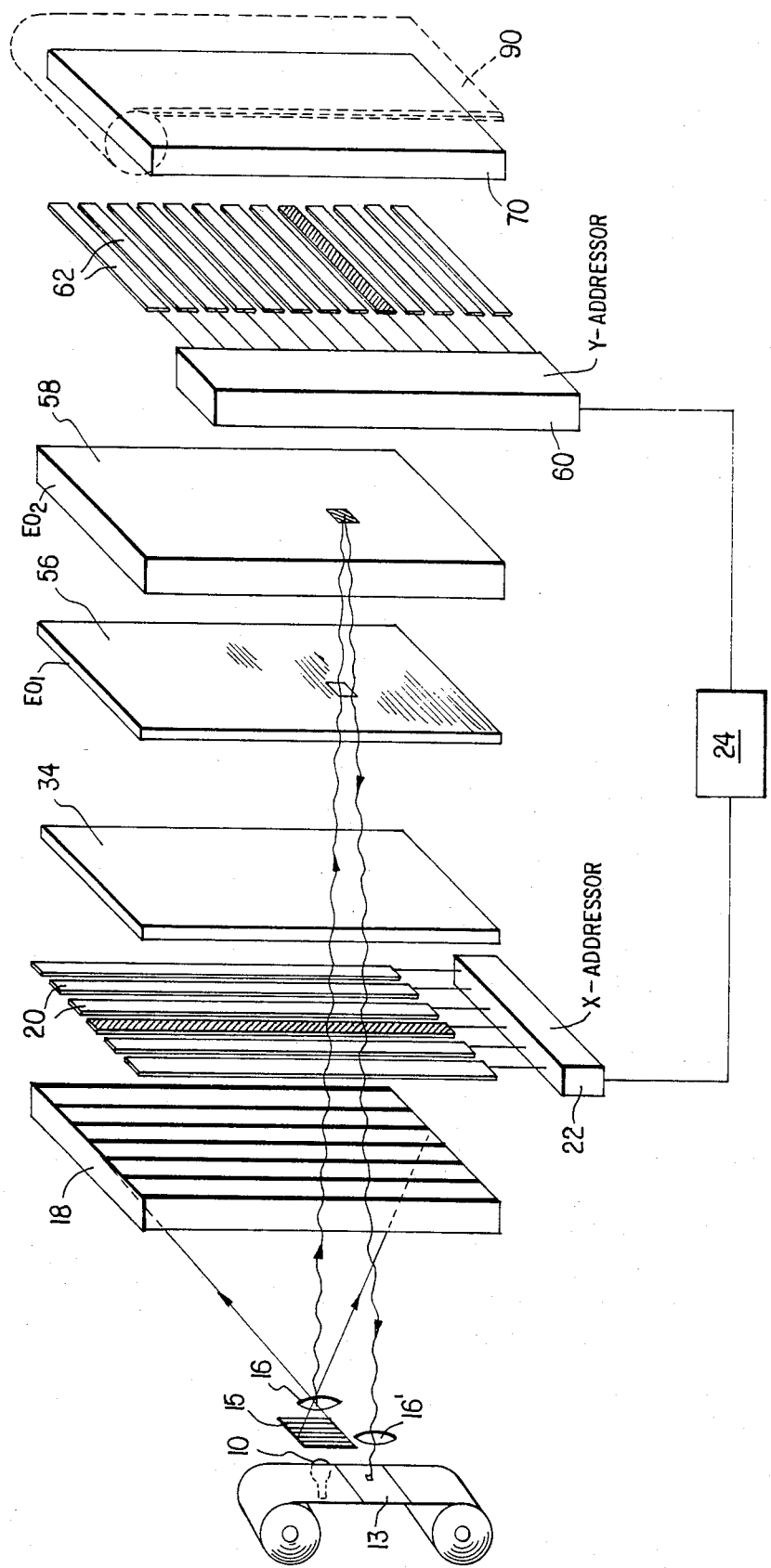
FIG. 9 is a view of the device of FIG. 7 and illustrates the series recording mode.

Referring now to FIG. 9 of the drawings, the mode of operation of the device of FIG. 7 for recording series information will now be given. Again, source of illumination 10 projects a grid of vertical, opaque spaced lines onto transparent dielectric sheet 18. With the X and Y addressors operating through network system 24 to generate a frame corresponding to a scene being transmitted, light from source 10 passes through strips 20 and strikes photoconductor 34. For this mode, photoconductor sheet 34 must assume the form of a transparent film. Electro-optical sheets 56 and 58 undergo the same action as previously described, with light now passing through transparent photoconductor 34, optical system 16' and thence onto portion 13 of a virgin cassette film.

Figure 10:
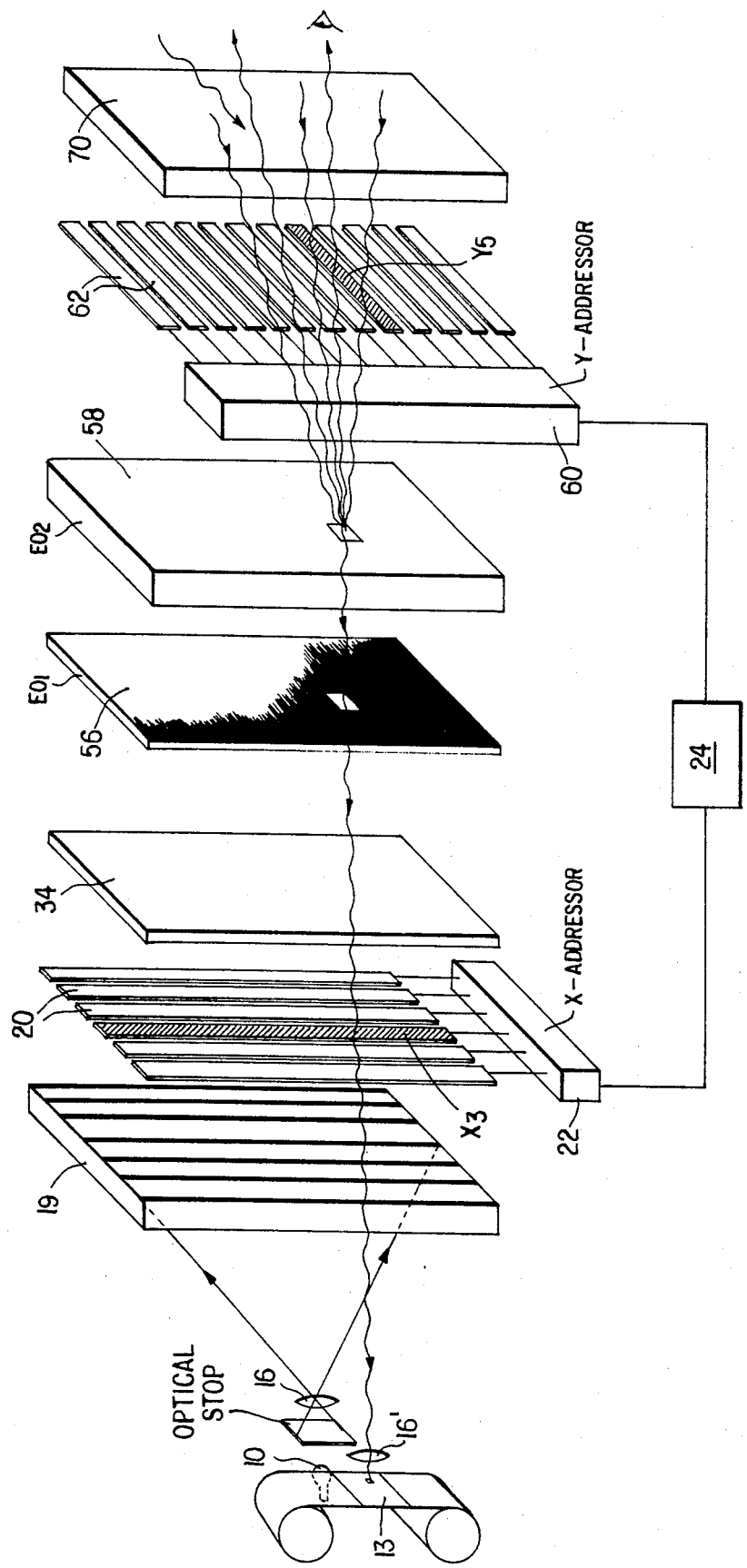
FIG. 10 is a schematic view similar to FIG. 1 and illustrates a device capable of both parallel and series viewing as well as simultaneous series viewing and recording.

Referring now to FIG. 10 of the drawings, another embodiment is illustrated for recording time sequential information. All of the elements are identical to those shown in the embodiment of FIG. 9, except that the grid lines are permanent on the transparent dielectric, and that the mirror 90 is not employed. In the embodiment of FIG. 10 strong ambient light passes from right to left through sheet 70 and onto electric-optic sheet 58. when the X and Y strips are activated, such as strip $X_3$ and $Y_5$, the indicated portion of electro-optic sheet 56 becomes clear and the indicated portion of electro-optic sheet 58 changes its color state, for example from clear to a red scattered or smitter for the ambient light. Hence, a portion of the light is recorded as a dot of red light on the virgin recording film 13. Another portion of the scattered light goes back to the observer, from left to right and through sheet 70.

Figure 11:
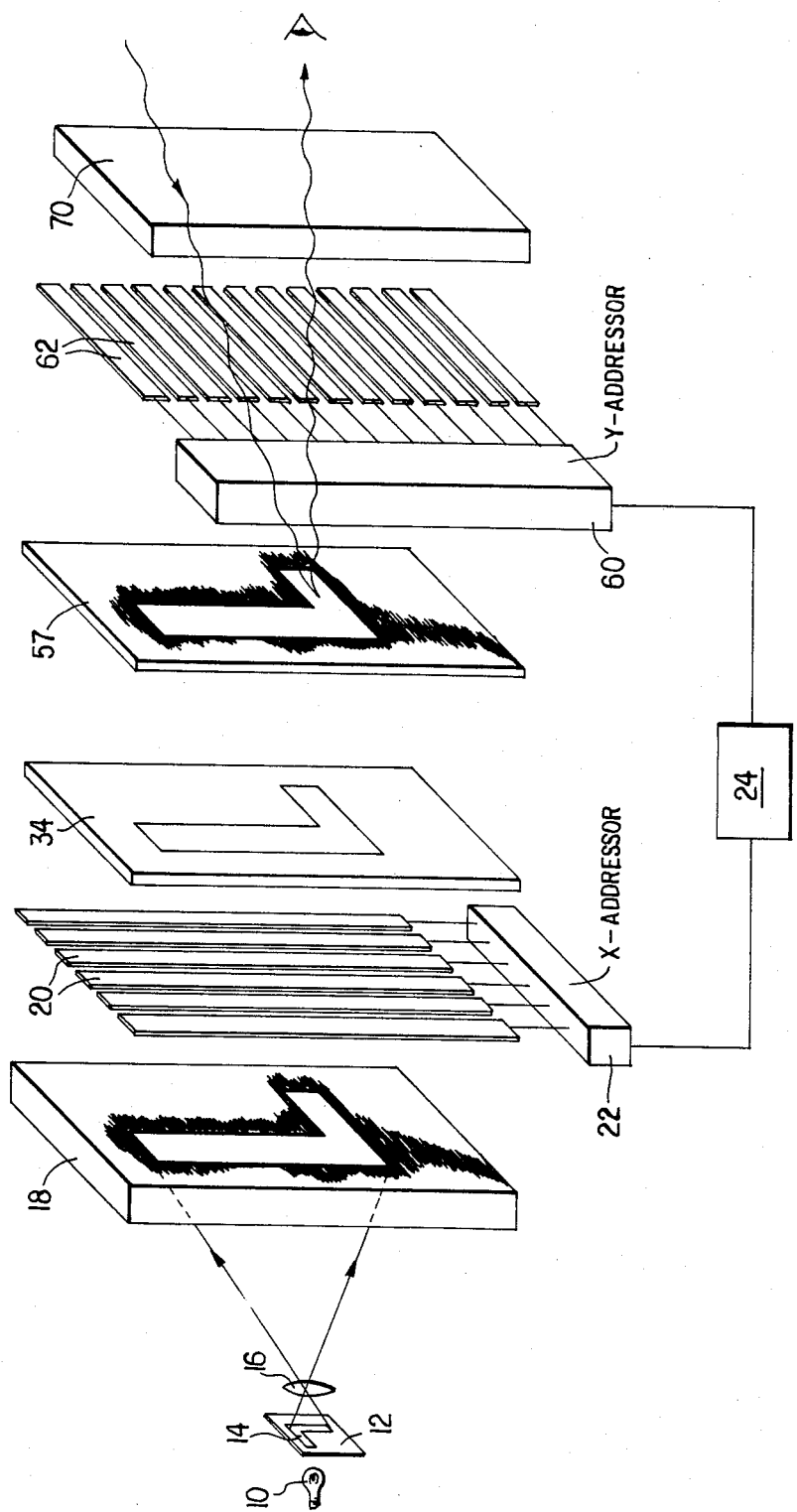
FIG. 11 is a view similar to FIG. 1 and illustrates a device capable of both parallel and series viewing as well as simultaneous series viewing and recording.

Referring now to FIG. 11, another embodiment is illustrated for viewing parallel information. As before, information in the form of a microimage 14 is projected on transparent dielectric sheet 18. Ambient light passes through transparent dielectric sheet 70 and transparent strips 62 of the Y addressor. The light strikes electro-optic medium 57 which is in the form of a sheet or plate. This sheet exhibits the property that with no electric fields or small electric fields thereacross it is opaque. However, with relatively high electric fields, the color state changes, for example, from opaque black to a clear state, such as red. Thus, when localized portions of plate 57 suffer an increase in electric field, such as is caused by the image object 14 (the letter L) the color state is accordingly changed. The result is a back-scattering of red ambient light from the left to the right and hence to the eye of the viewer.

Figure 12:
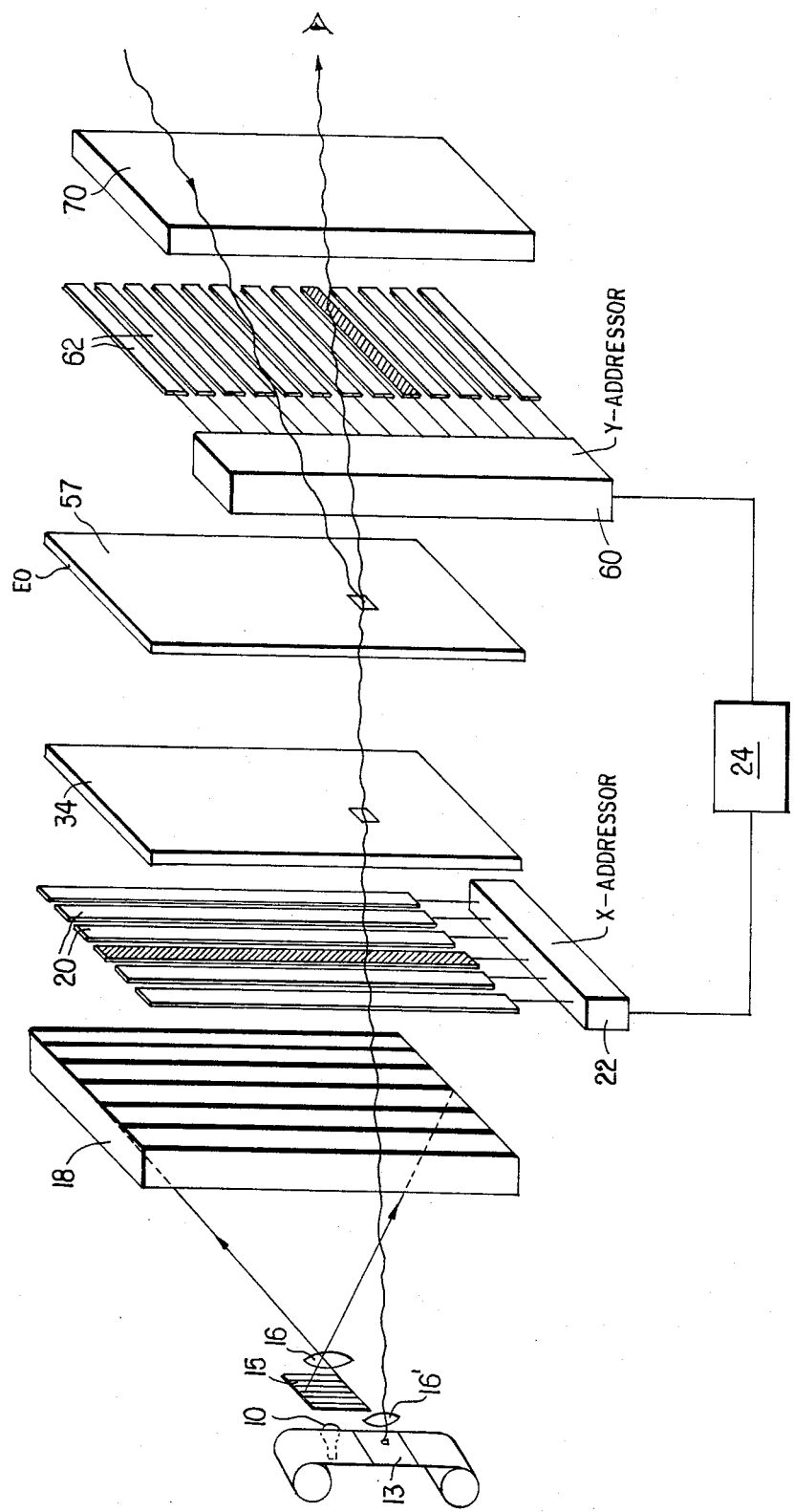
FIG. 12 is a view similar to FIG. 11 and shows the device of FIG. 11 in simultaneous series recording and viewing modes wherein a single electro-optic medium is employed.

Referring now to FIG. 12 of the drawings, a similar arrangement is illustrated which is capable of simultaneous time sequential recording and time sequential viewing. As before, the X addressor strips and Y addressor strips are activated by system 24. Discrete areas on photoconductor 34 and electro-optic sheet 57 are sequentially activated as previously described, with the result that sheet 57 changes for example from opaque black to a color state which allows the red portion of ambient light to be both back-scattered or emitted and forward-scattered or emitted. The back-scattered right light is perceived by the eye of the viewer, while the forward-scattered or emitted red light passes to film 13 for recordation. If viewing only is required, then the forward scattered light which passes to film 13 is not utilized. Some of the ambient red light is absorbed by the photoconductor and beneficially increases the conductivity of the photoconductor.

Figure 13:
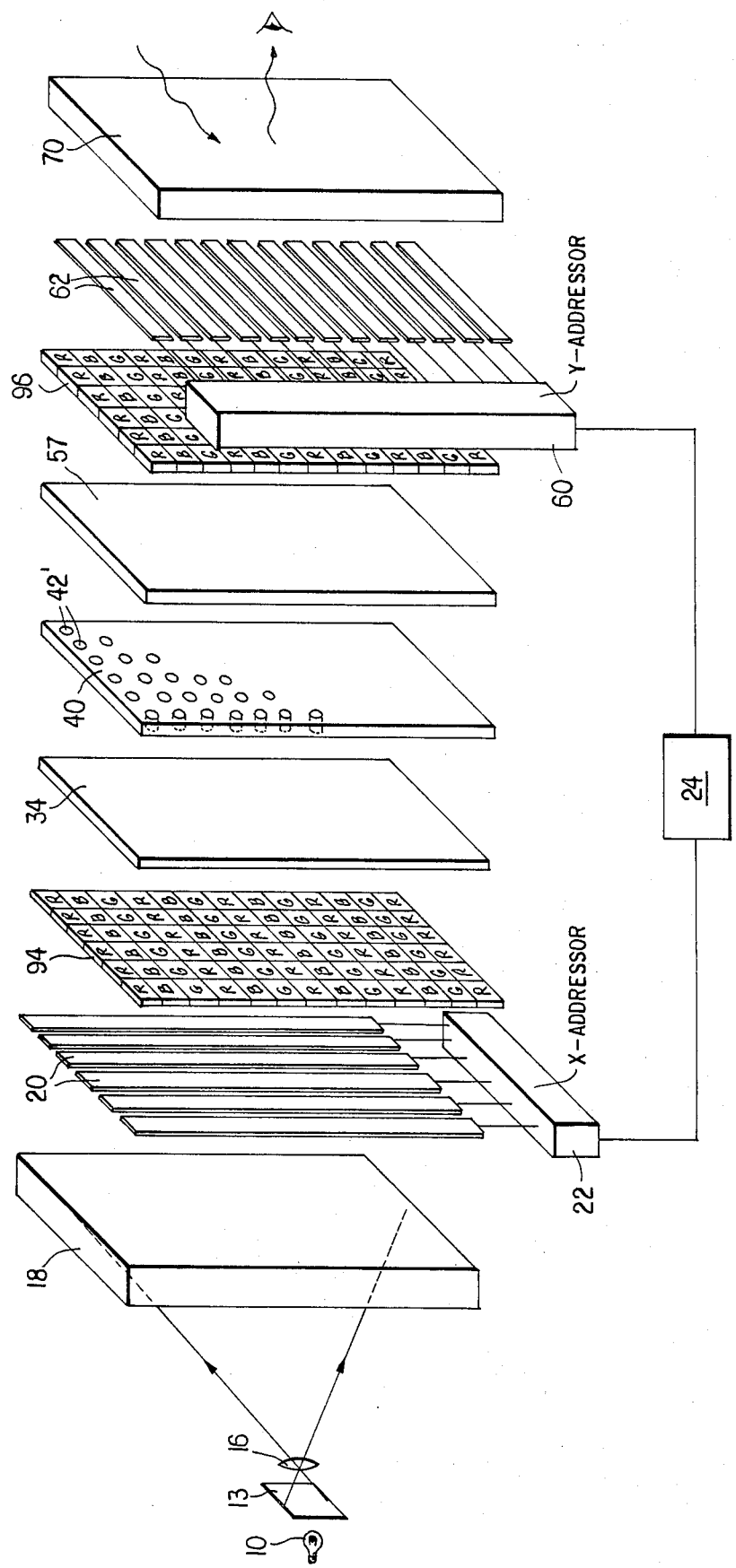
FIG. 13 is a view similar to FIG. 1 and illustrates a device operating in a mode for parallel color viewing.

Referring now to FIG. 13 of the drawings, an embodiment is illustrated of a parallel and series viewer capable of color operation. For parallel viewing the mode of operation is as follows. Colored information such as is carried by a transparency 13 is illuminated by white and falls light upon transparent dielectric 18. Assume the information contains red light. The red light will pass only through portions of color filter 94 which contain red filters, all the other filters blocking the red light. The red light will the pass to photoconductor sheet 34 which will, in turn, locally activate cylinders 42' of substrate 40, the cylinders each being aligned with a corresponding color filter in sheet 94. Cylinders 42' are similar to cylinders 42, for example having mirrored surfaces on their right-hand portions. Those conductors 42' which have been activated now cause normally opaque electro-optic sheet 57 to become clear at aligned regions. Meanwhile, strong ambient light from the right has passed through transparent dielectric 70 and the transparent strips 62 of addressor 60 and falls on color filter 96 which is similar to color filter 94 and is aligned therewith, with corresponding elements being in optical registry. The ambient light passes through all of the color filters but passes only through those portions of electro-optic sheet 57 which have been subjected to high electric fields, these being the only clear portions thereof. This light now strikes the reflecting faces of conductors 42' and is reflected back to the observer.

Figure 14:
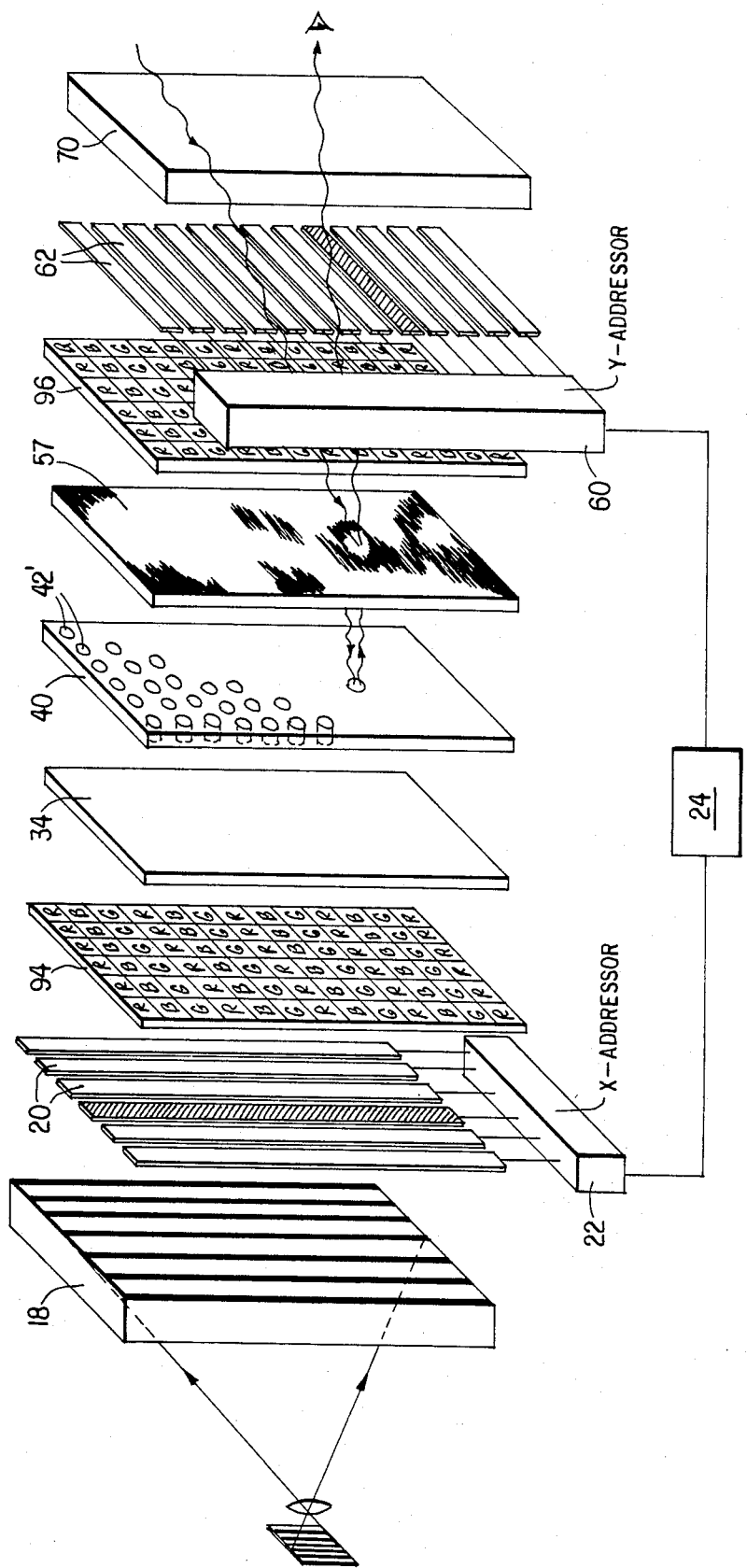
FIG. 14 is a view similar to FIG. 13 and illustrates the device of FIG. 13 in the mode for series color viewing.

Referring now to FIG. 14 of the drawings, the operation of the device shown at FIG. 13 will now be explained with reference to the time sequential mode. In this mode, a light grid is projected onto the transparent dielectric 18, as illustrated at FIG. 14. The voltage biasing due to circuitry 24 is such that when a voltage pulse is applied to a vertical strip such as $X_3$ and one to horizontal strip $Y_5$, then the color state of the electro-optic medium 57 is altered. The region thereof which corresponds to the intersection of these two X and Y strips changes from opaque to clear. Assume that at this location aligned red filters from filter sheets 94 and 96 are positioned. Accordingly, only red light will be reflected by the mirrored ends of elements 42'. Hence the viewer will perceive strong red reflected ambient light. During the operation of the X and Y addressors 22 and 60, the entire area of electro-optic medium 57 will be covered to thereby yield a complete image. The device shown at FIGS. 13 and 14 cannot, however, be used as a recorder of time sequential information because the opaque sheet 40 containing electrically conducting rods 42' prevents the selected color light from reaching the rear of the apparatus, i.e., the left of the apparatus.

Figure 15:
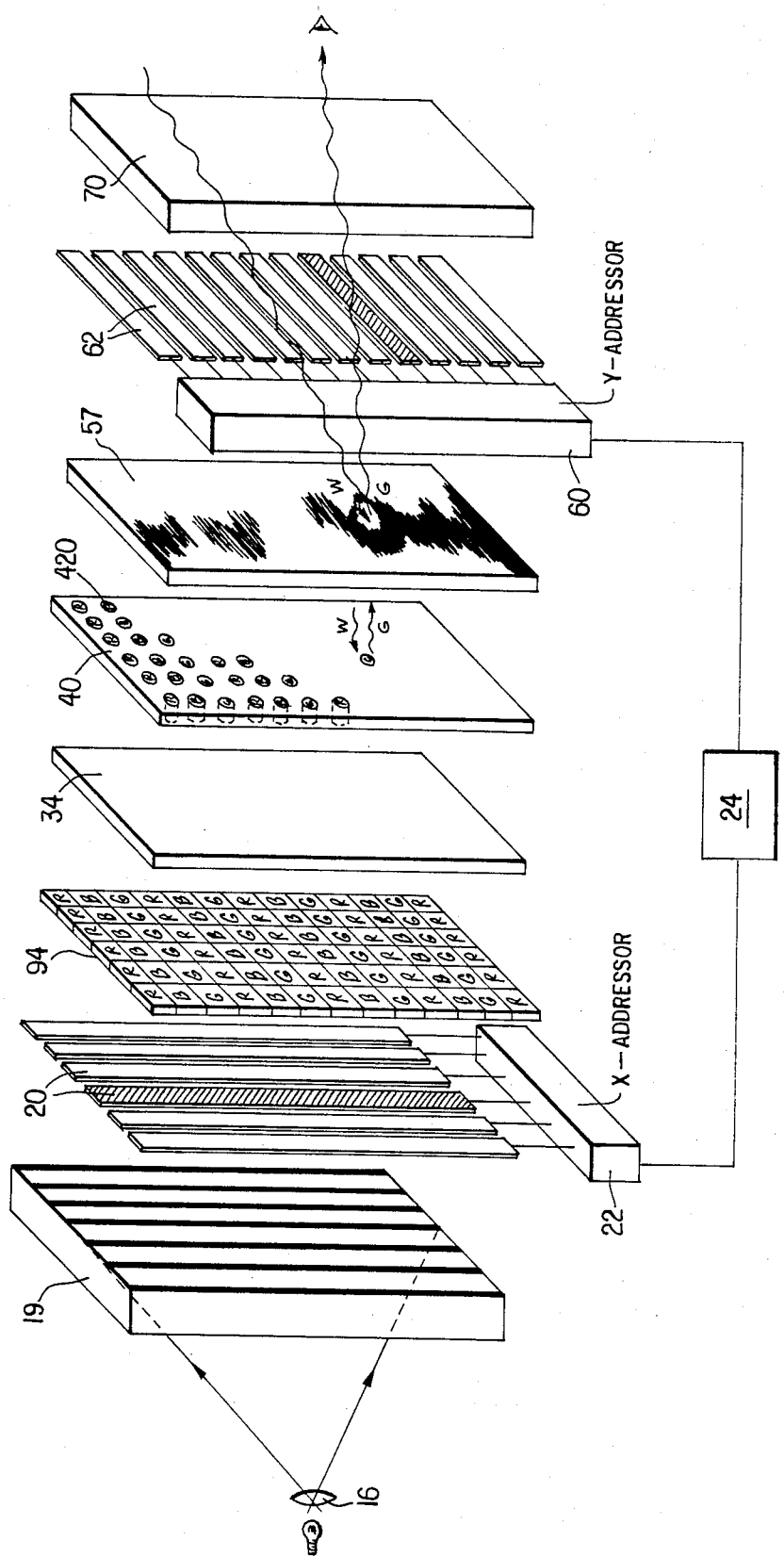
FIG. 15 is a view similar to FIG. 14 and illustrates another embodiment for series or parallel color viewing.

Referring now to the FIG. 15 another embodiment is illustrated which is similar to the embodiment shown at FIGS. 13 and 14. Here, however, instead of color filters 96, the righthand ends of the electrically conducting rods in substrate 40 are again mirrored but with colored surfaces. The numeral 420 denotes a typical conducting element for this embodiment and the reader will observe that mirrored colors of rods 420 and optically aligned with corresponding color filters of sheet 94. Otherwise, the mode of operation is identical with that described with relation to the embodiments of FIGS. 13 and 14.

Figure 16:
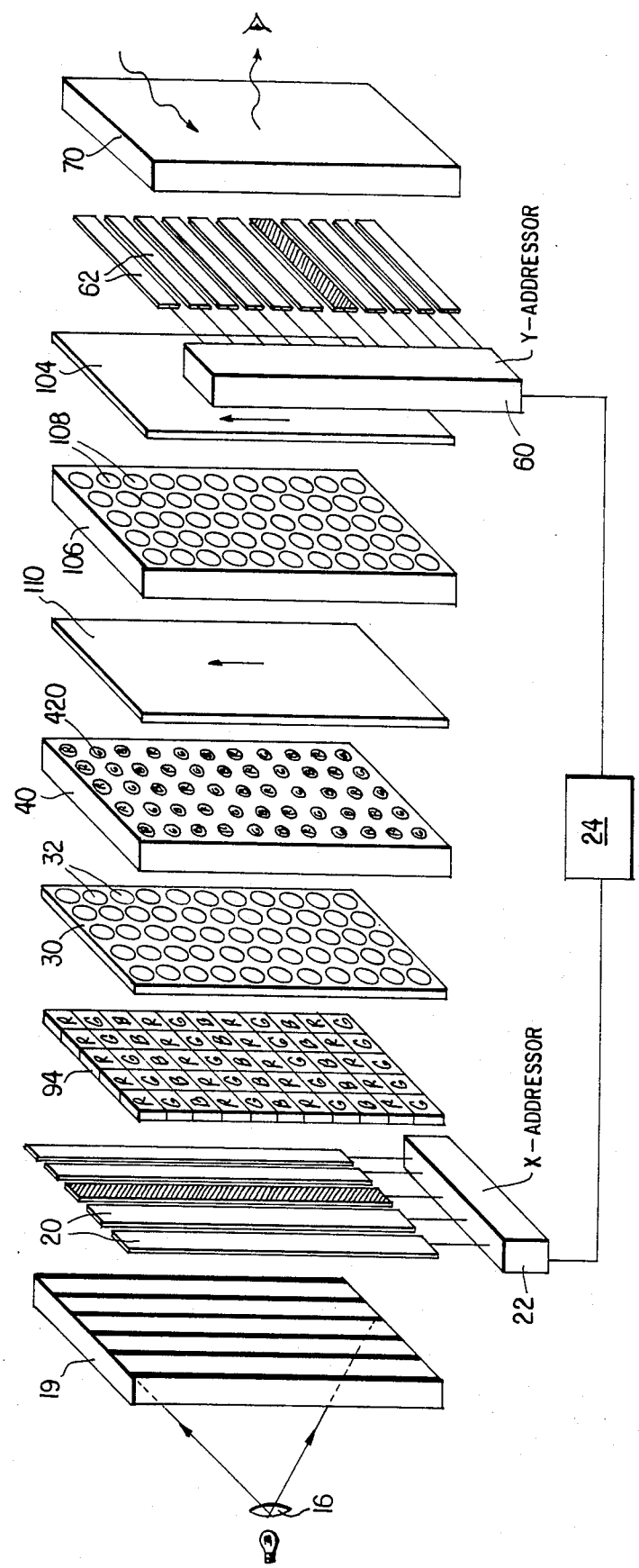
FIG. 16 is a partially schematic view of a twisted nematic color viewer showing its operation in the series mode.

Turning now to FIG. 16, another embodiment is illustrated. The parallel mode of operation will be evident in view of the following description of the time sequential mode of operation. The numeral 30 again represents an opaque sheet carrying discrete photoconductive plugs 32 arranged in the manner of a rectangular lattice. The numeral 40 denotes an opaque substrate carrying electrically conducting plugs or short cylinders 420 which are mirrored in different colors, as indicated on the righthand faces. The numeral 104 denotes a first polarizing plate polarizing light in a vertical direction, the numeral 110 denotes a second such polarizing plate. The numeral 106 denotes a substrate which carries a plurality of twisted nematic liquid crystal volumes in cells 108. The combination of elements 104, 106, 110 is termed a twisted nematic crystal and polarizer laminate. In operation, ambient light passes through polarizer 104 and is vertically polarized. In the absence of an electric field, nematic liquid crystals in cells 108 cause the light to be twisted 90 degrees and it is accordingly not passed by vertical polarizing plate 110. When, however, an electric field is applied to any one or several of the crystals in cavities 108, the light will no longer be rotated 90 degrees and will accordingly pass through second polarizer 110 and be reflected by the colored ends of conducting rods 420. Upon reflection, the viewer will then observe a scene.

Figure 17:
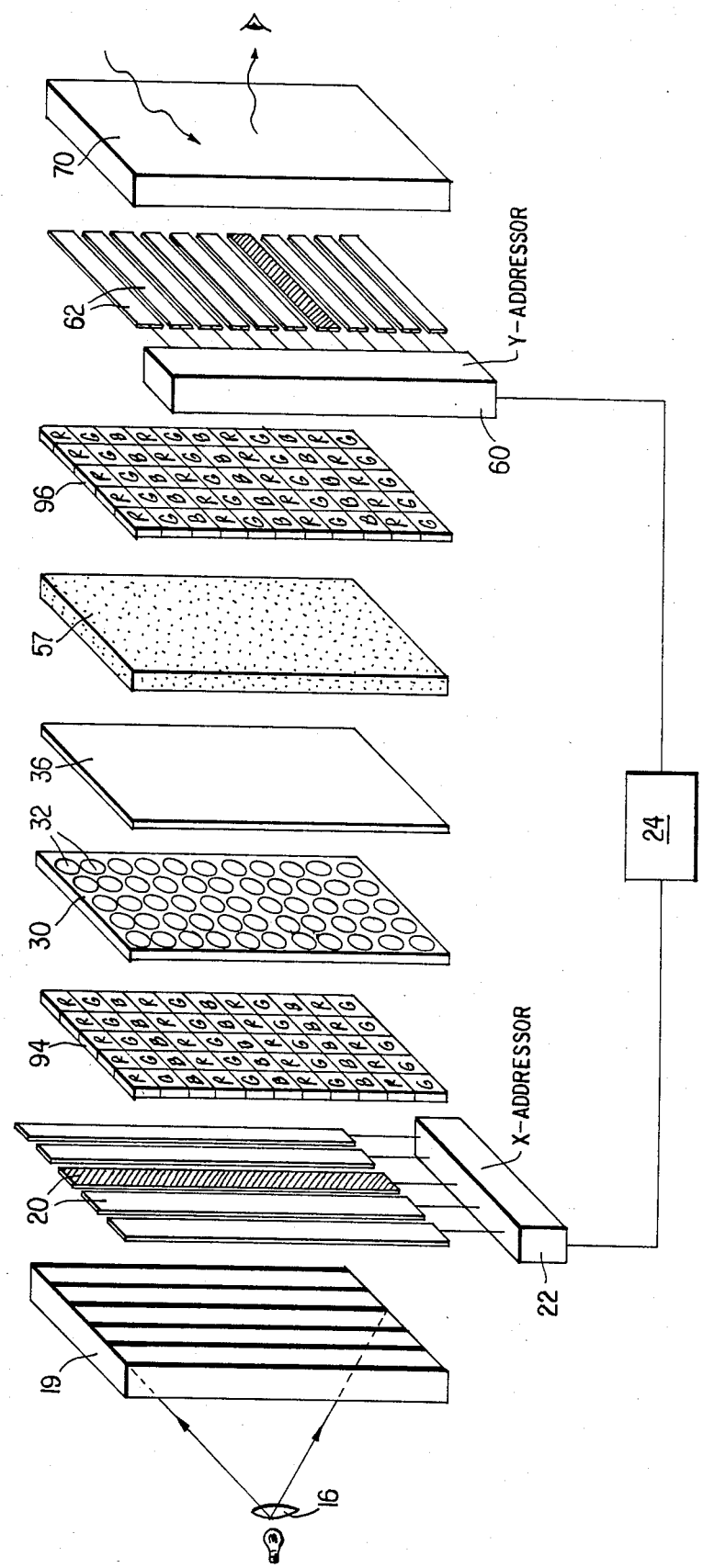
FIG. 17 is a view of another embodiment for series or parallel color viewing and illustrates the operation in the series mode.

Turning now to FIG. 17, another parallel and time sequential color viewer is illustrated. The description will now be offered of the time sequential mode of operation and the parallel mode of operation will then be apparent. With the X and Y addressors being sequentially activated to generate successive frames, ambient light passing in from the left to the right through color filters of filter array 96 is absorbed by electro-optic medium 57 at those regions thereof which are not subject to an electric field. At those regions which are subject to an electric field, however, ambient light strikes white scattering sheet 36 and is reflected or scattered back through electro-optic medium 57 and the appropriate color filter portions of filter array 96 for viewing. Sheet 36 may also assume the form of a dielectric mirror.

Figure 18:
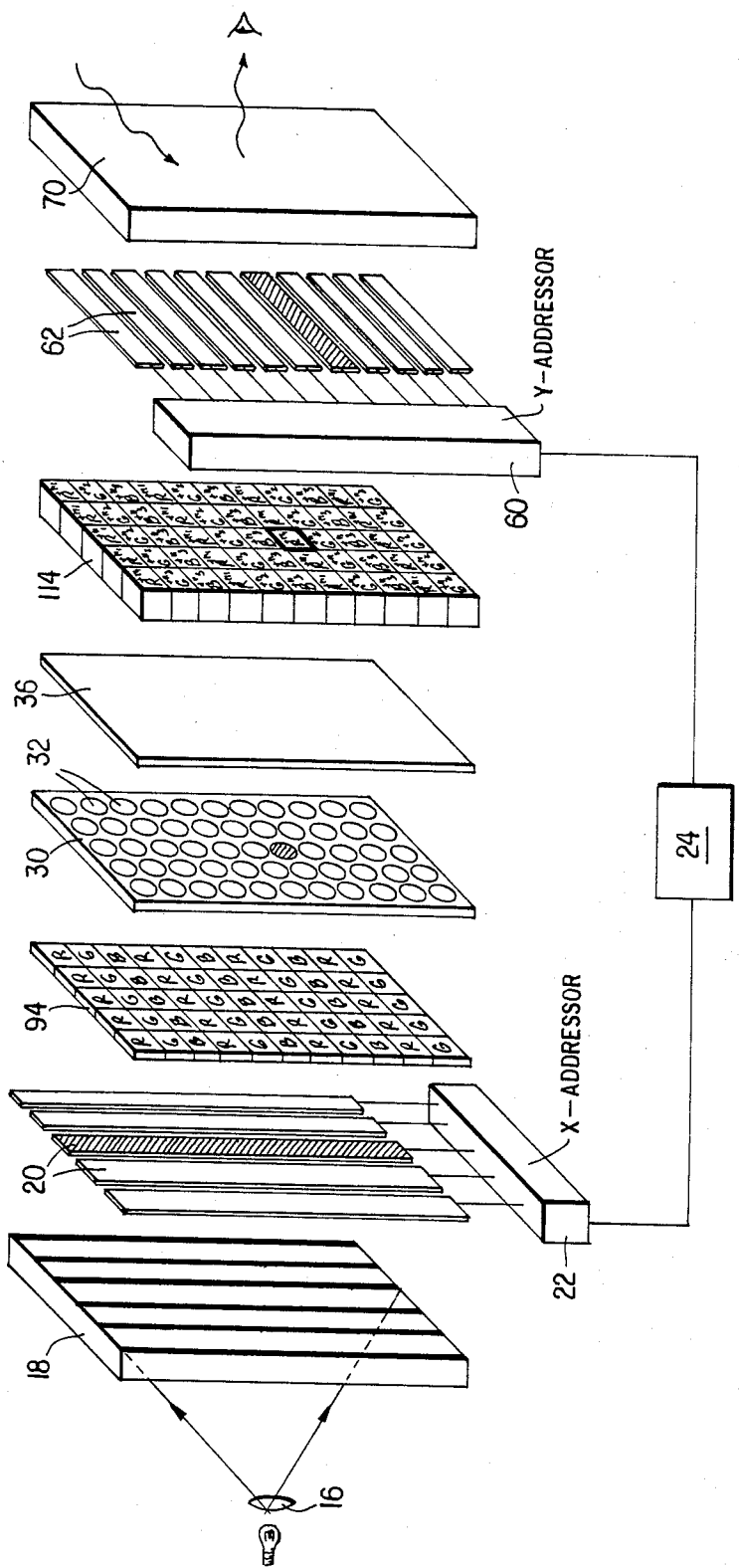
FIG. 18 is a partially schematic view of an embodiment employing solid state electro-chromic elements employed in a parallel and series color viewer. The illustration is given for the series mode.

Referring now to FIG. 18 of the drawings, still another embodiment is illustrated for both parallel and time sequential color viewing. The description will be given for the time sequential mode of operation. The numeral 114 denotes an electro-optic sheet having a lattice of electro-chromic materials which contain discrete red ions $R + N_1 + N_1$, green ions $G + N_2 + N_2$ and blue ions $B + N_3 + N_3$. In the off state, corresponding to the absence of strong electrical fields thereacross in the forward biasing sense, the materials in lattice 114 are opaque. However, when a strong electric field in the forward direction is impressed across the discrete color elements of the lattice, they act as color filters. Accordingly, when with respect to the electric field due to a given strip 20 and a given strip 62, the threshold field for the lattice elements 114 is exceeded, the color state across the associated discrete ion material changes. The material then functions as a color filter. This will permit light only of that particular color to pass through the lattice 114 and strike for example white dielectric scattering sheet or dielectric mirror 36 for reflection back to the observer. Thus, in the time sequential mode, the action of elements 22 and 60 generates a frame which yields color pictures.

Figure 19:
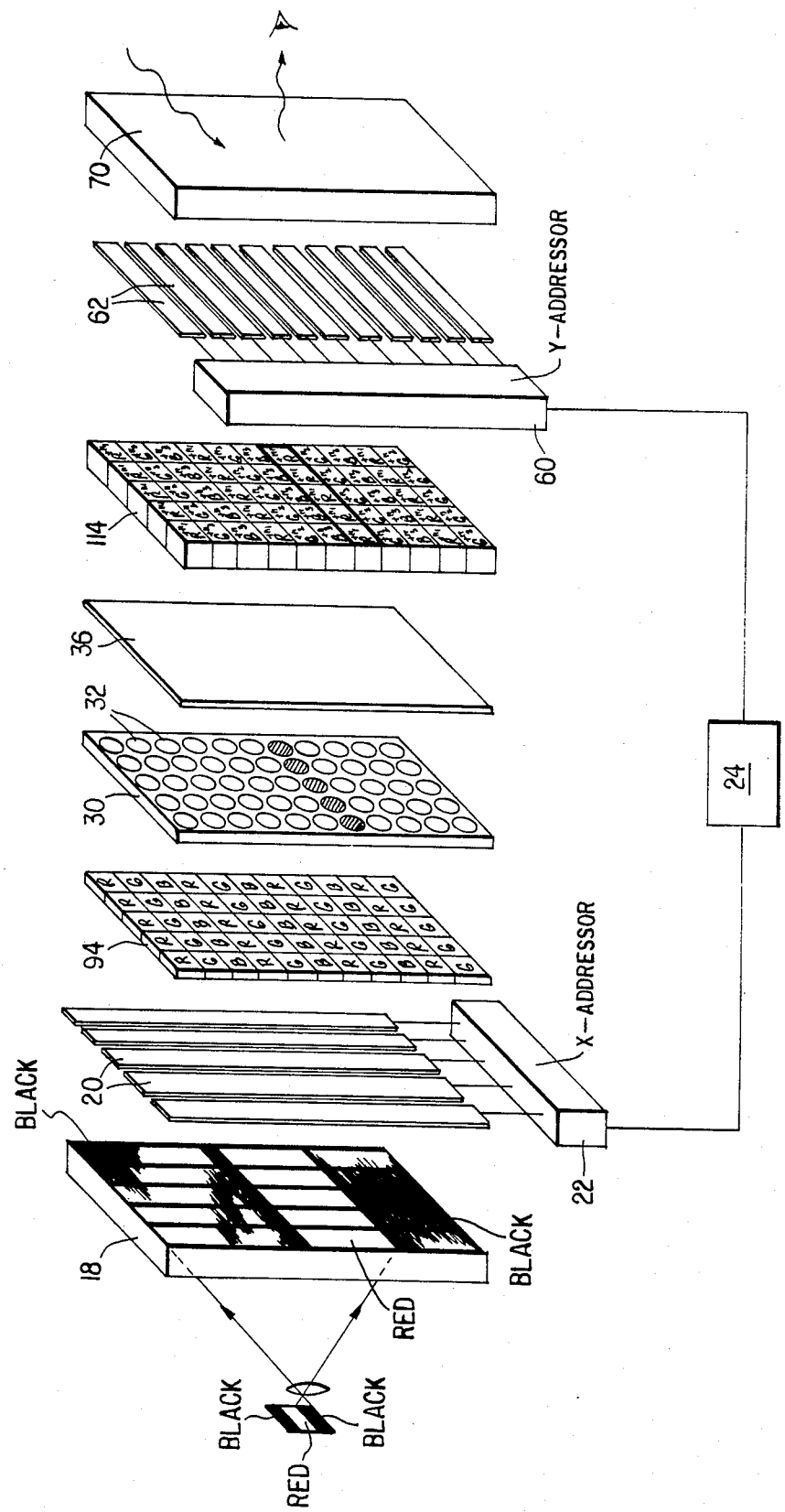
FIG. 19 is a partially schematic view of the device of FIG. 18 when employed in the parallel mode.

Referring now to FIG. 19 of the drawings, the parallel mode of operation of the device shown at FIG. 18 will now be described. If, for example, information in the shape of a strip containing weak red light is incident from the left, the electric field locally increases as previously described across any discrete red ion cell in lattice 114. The result is that the material of the lattice which contains such ion material functions as a red color filter. Ambient red light from the right will pass through the lattice 114, be reflected or scattered back from sheet 36 and then reflected or scattered back towards the right to the observer. For illustrative purposes only the red strip is shown on a black background. Ordinary use would embrace or accept common colored transparencies.

Figure 20:
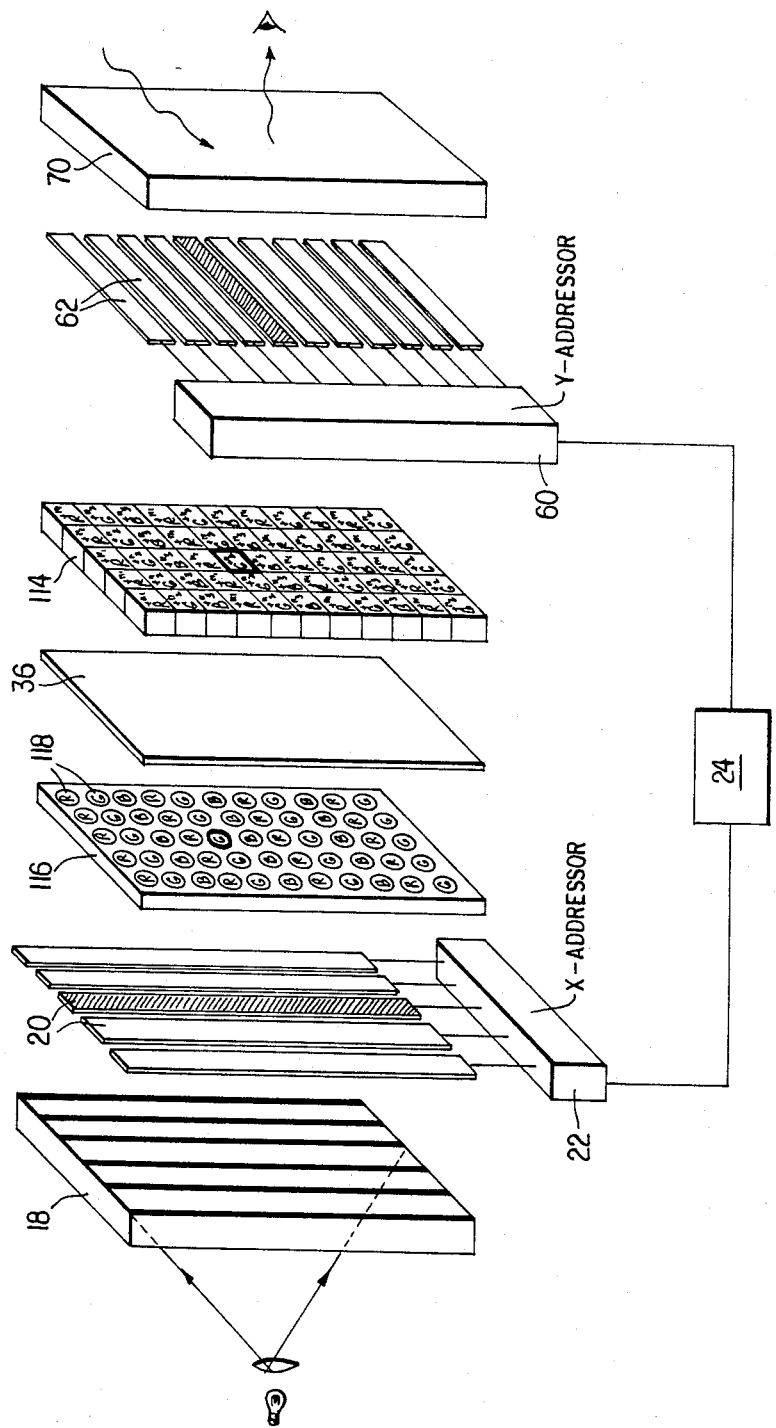
FIG. 20 is a view of another embodiment of a parallel or series color solid state electro-chromic viewer when employed in the series mode.

Referring now to FIG. 20, an embodiment similar to that of FIGS. 18 and 19 is illustrated. The numeral 116 denotes an opaque substrate carrying a lattice array of photoconductors 118. Each photoconductor is responsive only to light of a certain color, such as red, green, or blue, as noted by the initial letters of the name of those colors. Thus, if green light falls on substrate 116, only photoconductors 118 corresponding to green will change their electrical resistivity. The time sequential and parallel modes of operation are believed apparent and will accordingly not be given.

Figure 21:
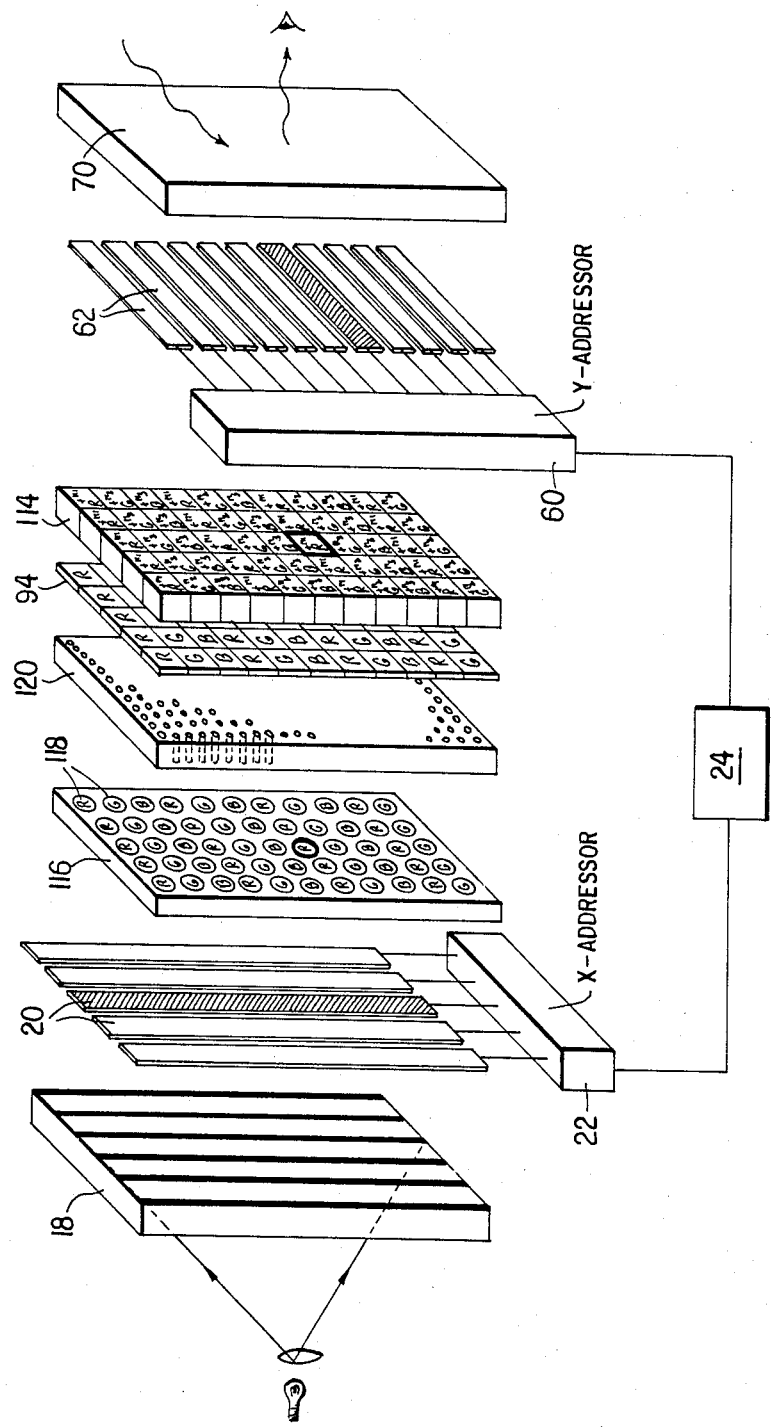
FIG. 21 is another embodiment of a solid state electro-chromic parallel and series color viewing device and illustrates the operation in the series mode.

Referring now to FIG. 21, a slightly more complex parallel and time sequential color viewing apparatus is illustrated. The numeral 120 denotes an opaque plate carrying parallel, electrically conducting rods which are mirrored on their right ends, i.e., the observer ends. Color filter lattice 94 and color ion lattice 114 follow element 120. Thus, the device shown at FIG. 21 has four of a possible eight components or layers in the form of a gravure lattice. In this manner, less power is required and the accuracy of resolution is also controlled. The mode of operation for time sequential viewing is believed apparent. Namely, ambient light coming in from the right, as the addressors 22 and 60 generate frames, strikes lattice members 114, 94, and 120. Only if there is proper color registry with a particular zone of these lattice members will light be reflected from the mirrored ends of rods 120. For the viewing in the parallel mode, the mode of operation is believed apparent.

Figure 22:
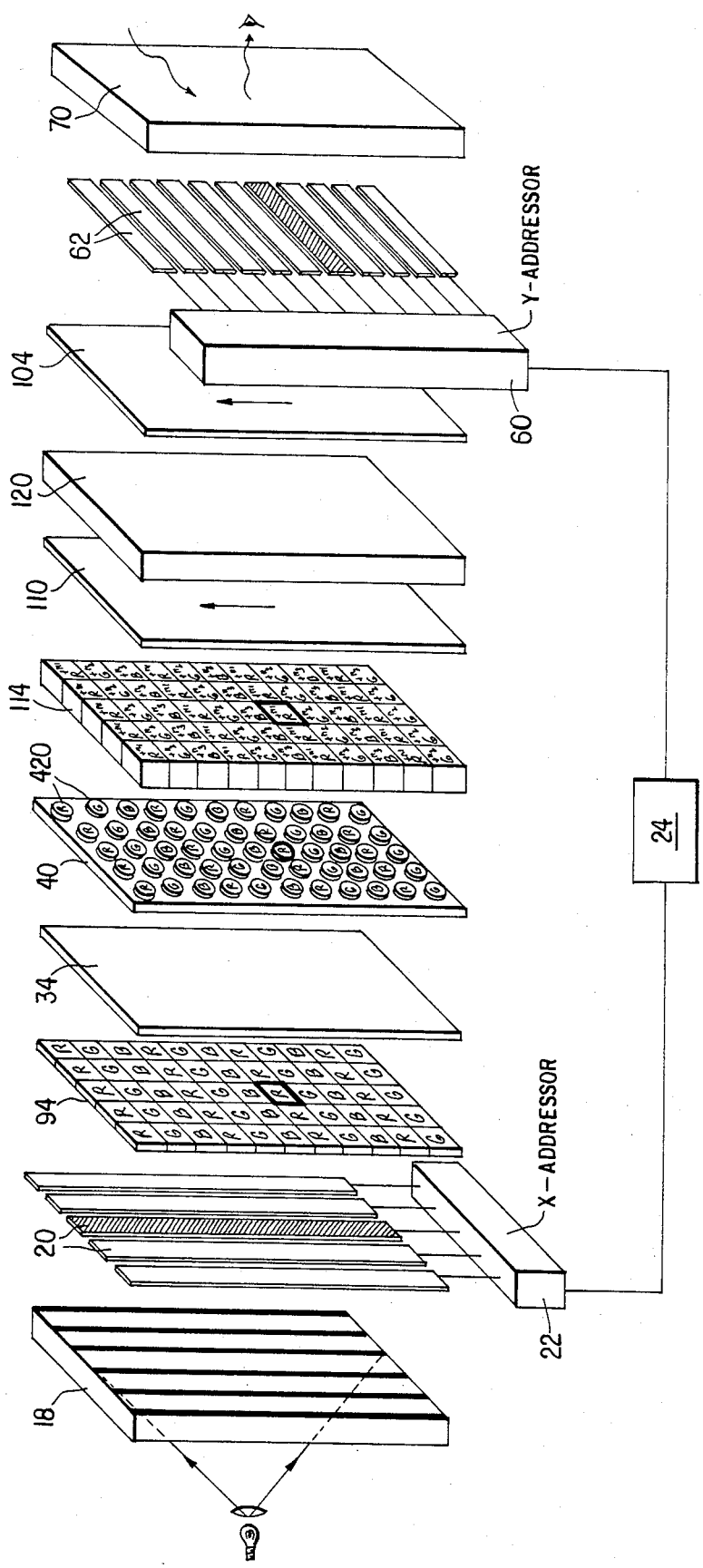
FIG. 22 is a partially schematic view of a twisted nematic liquid crystal parallel and series color viewer shown in the series mode.

Referring now to FIG. 22 of the drawings, a construction is set forth which employs twisted nematic liquid crystal elements for both parallel and time sequential viewing in color, FIG. 22 illustrating the time sequential mode. In operation, ambient light coming in from the right is selectively transmitted and reflected back through mirrored ends of conductors 420 to the observer. The reader will readily understand that whenever a cell of nematic liquid crystal substrate 120 is subject to an electric field, it no longer twists light 90° and the light is then free to pass through second polarizing plate 110 for subsequent reflection to the viewer.

Figure 23:
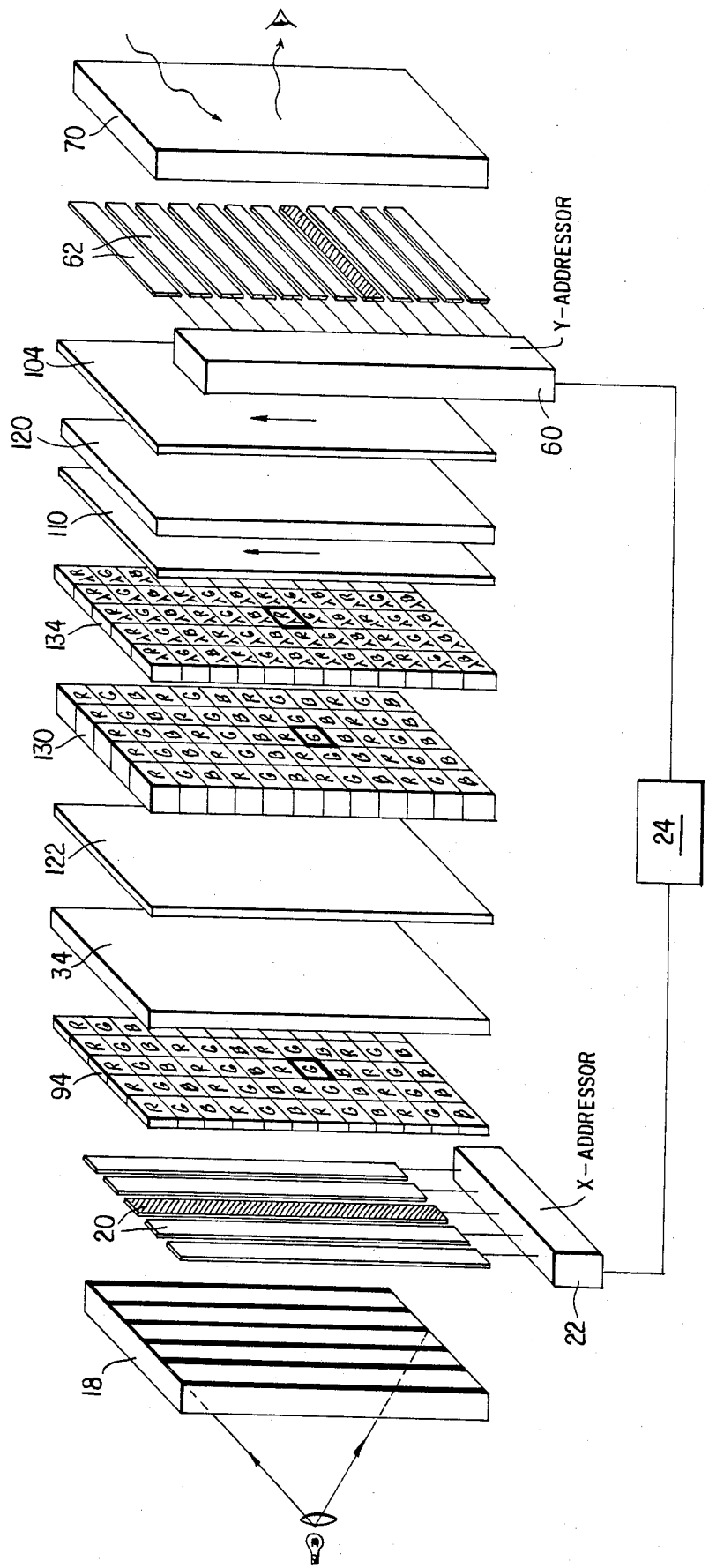
FIG. 23 is a partially schematic illustration of a cholesteric twisted nematic parallel and series color viewer in the series mode.

Referring now to FIG. 23, a more complex crystal parallel and time sequential color viewer is shown. It functions in essence as a solid state panel because the gravure electro-optic cells are bounded by solid anti-diffusion and anti-lateral motion elements. Numeral 34 represents a photoconductor sheet while numeral 122 represents an opaque dielectric sheet. Numeral 130 illustrates a gravure lattice of cholesteric crystals of the lefthanded type and having individual domains for the colors red, green, and blue as indicated. All of the color elements are in corresponding optical alignment. Next to lattice element 130 chromatic quarter wave plate 134 in the form of a gravure lattice array having the indicated color matching birefringent elements is positioned. As before, numeral 120 represents a 90 degree twisted nematic liquid crystal sheet. Whenever there is an increase in electric field across them, elements of the quarter wave plate 134 convert ambient light into lefthand circularly polarized light. Ambient light passes through polarizer 104 and becomes vertically polarized and is then twisted 90 degrees by nematic sheet 120. With no electric fields present, such light is accordingly absorbed by the second polarizer 110. In the on mode, however, high electric fields occur and light passes through the second polarizer 110 and onto the quarter wave plate 134 at those regions thereof which are in alignment with vertical addressor strips 20 and horizontal strips 62. Ambient light which passes through quarter wave plate 134 becomes lefthand circularly polarized light, is now incident on gravure lattice 130 and is then reflected by the lefthanded cholesteric liquid crystal back to the observer.

The parallel mode of operation for the apparatus of FIG. 23 is believed apparent and will accordingly not be given.

Figure 24:
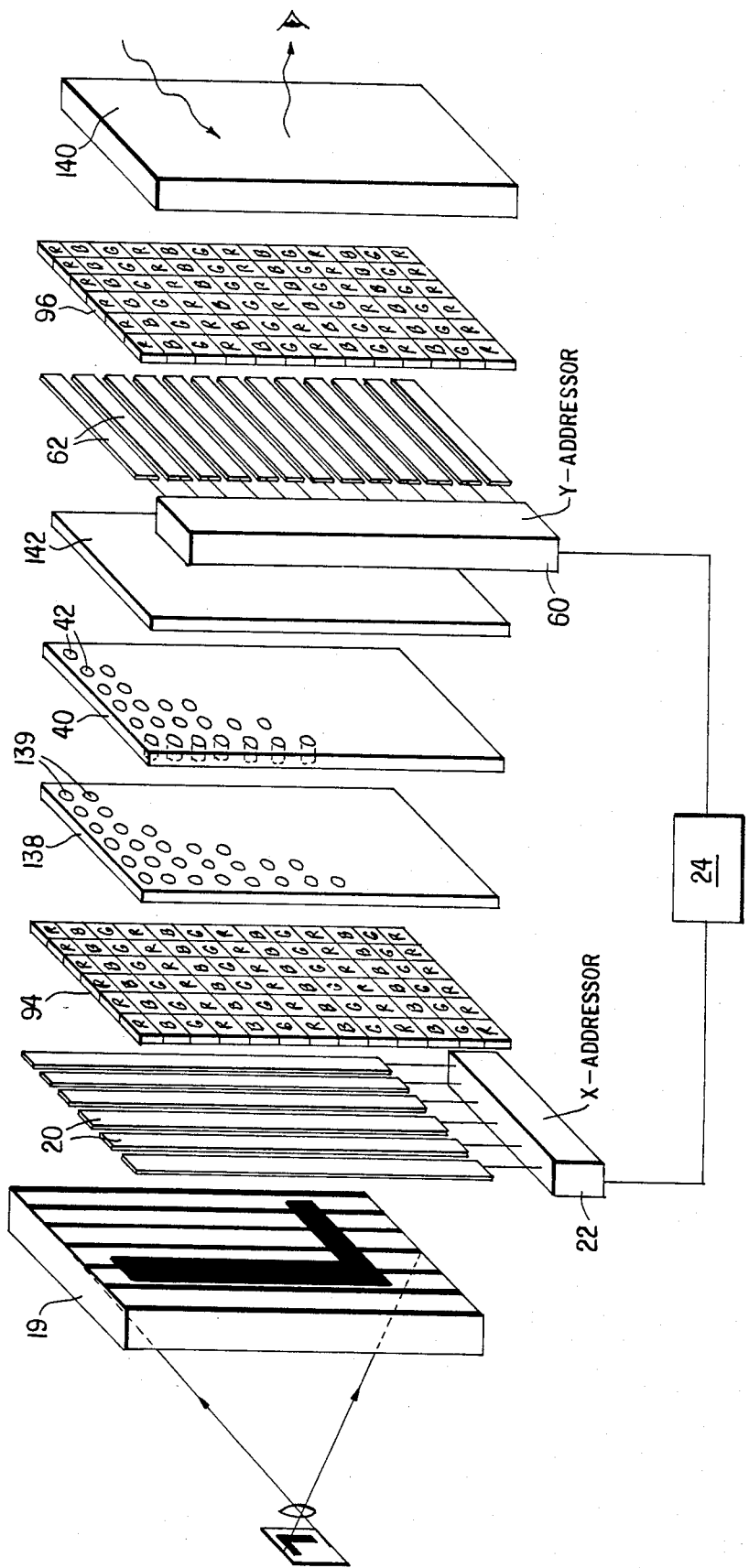
FIG. 24 is a view of another parallel or series color viewer employing a conductive elastomer and shows the parallel mode.

Referring now to FIG. 24 of the drawings, another modification of a series and parallel mode color light amplifier and viewer is illustrated and may be termed a solid state device. This modification differs from previous embodiments in that it employs an elastomer and depends for its action upon the fact that in certain configurations an elastomer will undergo a strain upon the application of an electric field thereacross. The strain is a wrinkling type of deformation which occurs at a particular interface. A block or sheet of transparent conductive elastomer 140 on the ambient light side of the apparatus is in contact with gravure color filter array 96, in turn in registry with transparent, horizontal strips 62. The strips 62 of this embodiment may assume the form of a light reflecting coating such as evaporated island structured indium. An opaque, non-conducting elastomer sheet 142 is positioned between opaque sheet 40 and color filters 96. Opaque sheet 40 carrying light conducting rods 42 is positioned to the left of sheet 142, the former in turn adjacent photoconductor sheet 138 carrying indicated photoconductive elements 139 in a lattice array. All of the color filters and photoconductor elements shown which are discrete are in optical registry. The mode of operation of the elements of FIG. 24 in the time sequential mode is as follows. A grid of light is projected onto photoconductor sheet 138 to thereby make the photoconducting plugs 139 conducting where light strikes them. If now a voltage pulse from addressors 22, 60 is applied to a vertical and a horizontal strip, then their intersection generates an electric field such as that the interface between the transparent conductive elastomer 140 and the insulating elastomer 142 will become deformed and wrinkled to thereby scatter ambient light. The scattered light, in any instant of time will correspond in color to the color fiter through which it passes, this in turn being governed by the particular vertical and horizontal strips 60 and 62 which are activated. The mode for operation for parallel viewing for the device of FIG. 24 is believed obvious and will not be offered.

Figure 25:
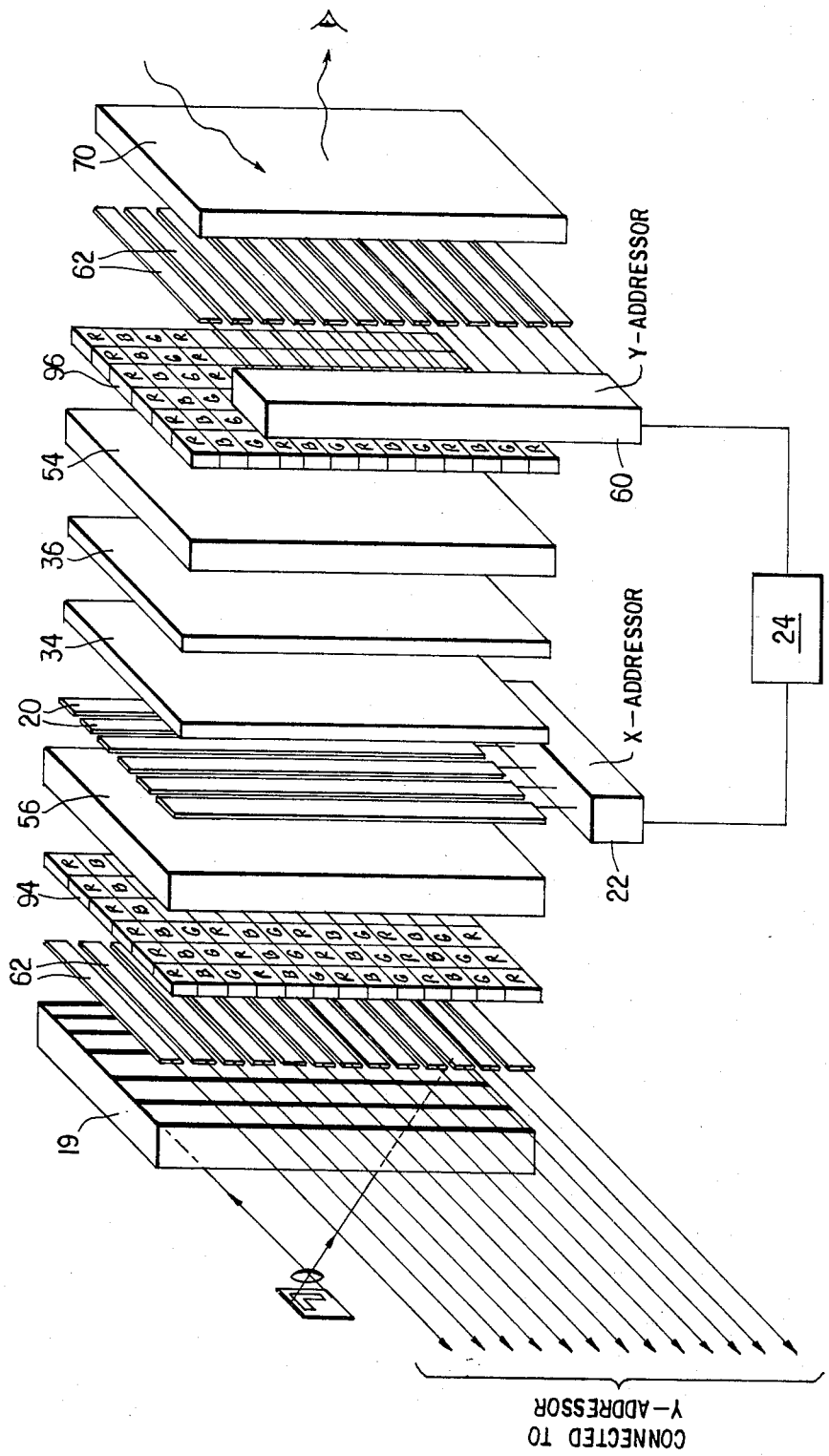
FIG. 25 is a schematic view of a parallel and series chromatic viewer for simultaneous series recording and viewing and for parallel or series viewing.

Referring now to FIG. 25 of the drawings, a device is illustrated which admits of not only parallel or series viewing, but further admits of simultaneous recordation of series information. These functions are further performed in color. At FIG. 25 a slide or film bearing colored micro information in the form of L is projected through a color gravure lattice 94 after first passing through transparent dielectric 19 and first horizontal Y addressor strips 62. These first addressor strips are inactive for the parallel mode and the first electro-optic sheet 56 is transparent in the off position and is inactive. The X addressor 22 and the second Y addressor 60 are at such potentials that the second electro-optic sheet 54 can be activated when electric fields thereacross are sufficiently large. The mode of operation is as follows. Assume that red information transmitted by weak light passes through the red filters of lattice filter array 94 and accordingly makes photoconductor sheet 34 conducting at localized portions. Relatively large electric fields are thereby generated and switch corresponding localized portions of the second electro-optic sheet 54 from the off to the on state. A black opaque barrier 36 separates the photoconductor and second electro-optic sheet 54 and prevents ambient light from generating cross-talk with the weak color signal. If now the second electro-optic sheet 54 changes its optic state from clear to scattering with the application of an electric field, then ambient light passing through the red filters of array 96 is scattered back to the observer. Elsewhere, the ambient light passes through the color filters of array 96 through the clear electro-optic medium 54, and is then absorbed by the black absorber 36.

The reader will now observe that any of the modes of parallel color viewing shown at FIGS. 13 to 24 inclusive may be used between the X addressor and the right-hand Y addressor 60 of FIG. 25.

Figure 26:
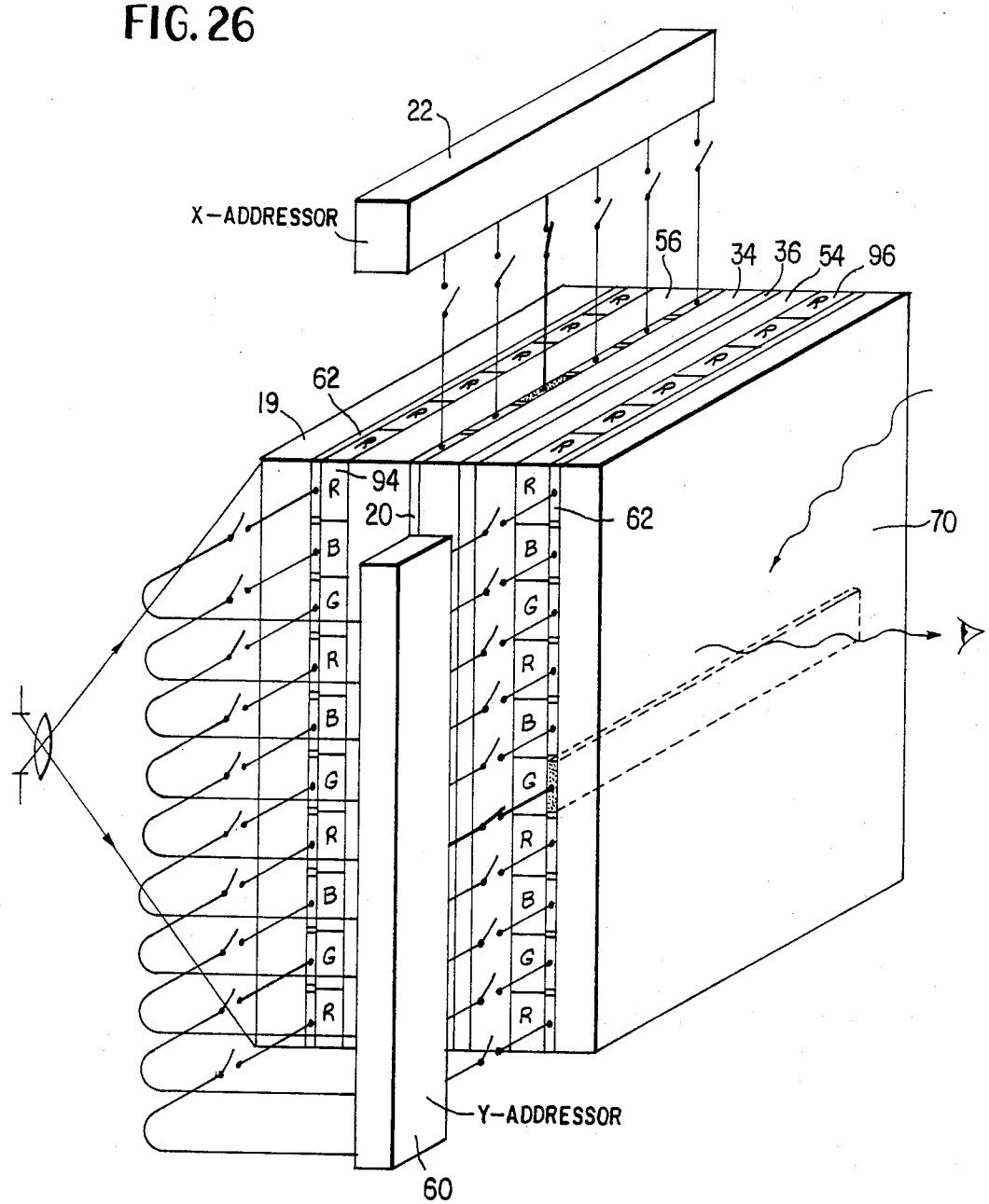
FIG. 26 is a view of the device as shown at FIG. 25 and illustrates the series viewing mode.
Figure 27:
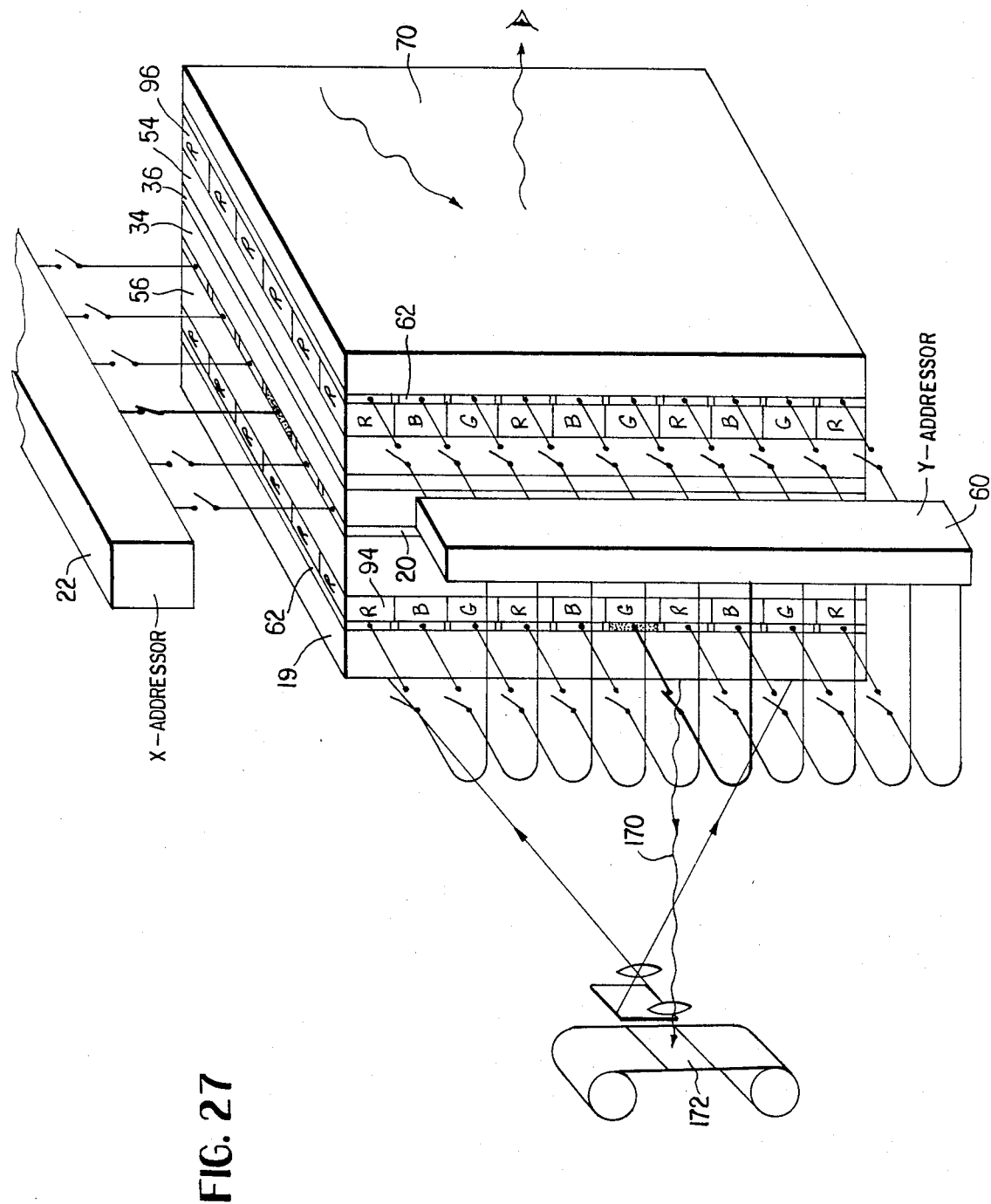
FIG. 27 is a view of the device of FIG. 25 and illustrates the recording serial mode.
Figure 28:
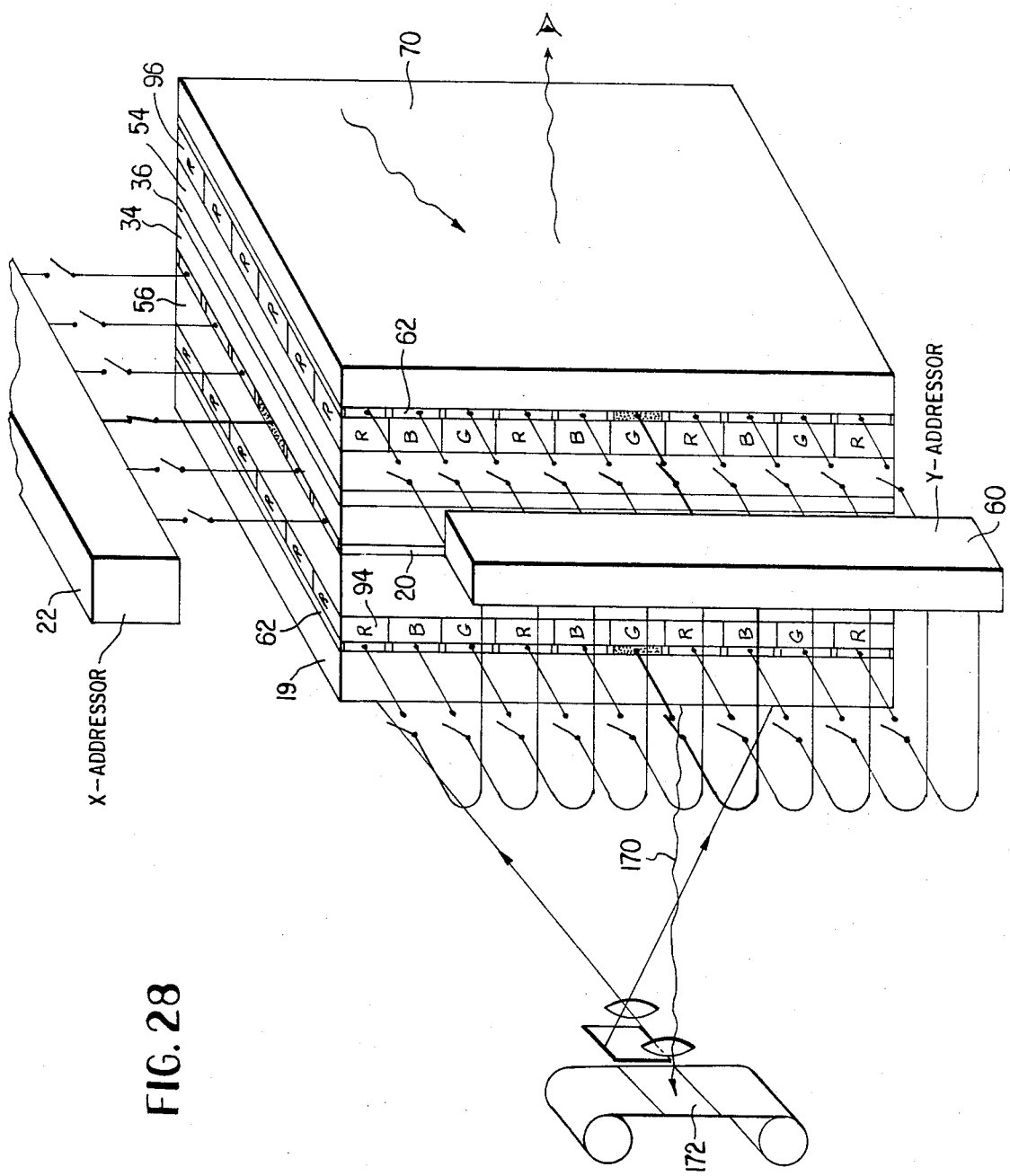
FIG. 28 is a view of the device of FIG. 25 and illustrates the mode for recording and viewing simultaneously.

FIGS. 26, 27 and 28 of the drawings show the device of 25 and will now be described with respect to different modes of operation. Referring firstly to FIG. 26, a grid of light in registry with the X addressor is incident on the photoconductor 34. Alternatively, as shown at FIG. 27, a cone of light passing through opaque strips generate such a grid of light. If now voltage pulses which are applied to the X and Y addressor strips coincide with a localized green filter, then the second electro-optic medium 54 is activated and again scattered ambient green light reaches the observer.

Referring now to FIG. 27, a grid of light is incident on the first electro-optic medium 56. Assume again that this electro-optic medium changes from a transparent state to a scattering state when an electric field is applied to it. As by applying voltage pulses to the X and Y addressors strips. The green portion of the incident light is now scattered backward if the localized voltage pulse coincides with the green filter and recorded on virgin recording material. (Note that ambient light plays no role here.) The light which is scattered back for recordation on the virgin film is denoted by the numeral 170 while the virgin film is denoted by the numeral 172.

Referring now to FIG. 28 of the drawings, a grid of light is incident on both the electro-optic medium 56 and the photoconductor 34. All three addressors are utilized. The voltage signals to the two Y addressors are essentially identical if the same time sequential information is simultaneously viewed and recorded. However, if for example one TV channel is recorded and a different channel viewed simultaneously, two separate Y addressors are required (not shown). Assume a voltage pulse on an X and a Y strip. Then the first electro-optic medium 56 scatters green grid light onto the virgin recording material 172 and the second electro-optic medium 54 scatters ambient green light to the eye of the observer. Hence, simultaneous series recording series recording and series viewing is obtained.

Referring now to FIGS. 29–32 inclusive, a different parallel and series color viewer which allows simultaneous series viewing and recording is illustrated. In essence, it performs the same functions as the apparatus described with respect to FIGS. 25 to 28 inclusive.

Figure 29:
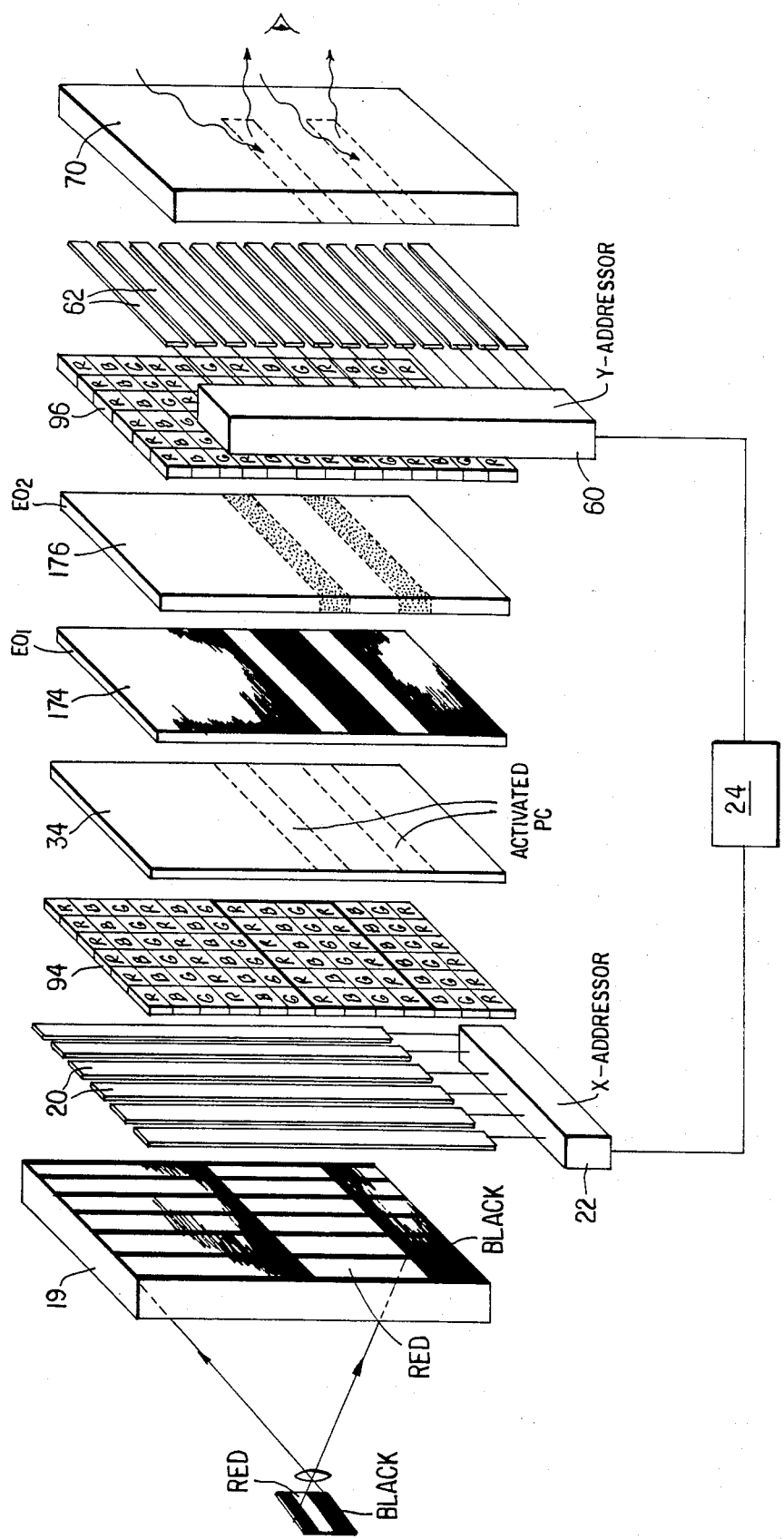
FIG. 29 is a partially schematic view of a color device for simultaneous serial color recording and viewing or parallel or series viewing, the illustration being shown for the parallel mode.

Referring now to FIG. 29 illustrating the parallel chromatic viewing mode, a magnified color image in the shape of a red strip on a black background is formed on a photoconductor layer 34. The transparent conducting strips 20 and 62 are, respectively, of the same potential but different from each other. Where the color light is incident on photoconductor 34, the electric fields are such that the first electro-optic medium 174 changes from black opaque to clear and the second electro-optic medium 176 changes from one color state to another such as from clear to scattering or, for example, from clear to red if electro-optic cells exist. Where no light is incident thereon, the electro-optic sheet 174 will be black and the electro-optic sheet 174 will remain clear. Hence, in the example shown in FIG. 29, the observer will perceive two red strips caused by ambient light being scattered back through red filters in 96 on a black background. The reader will note that the opaque background in the normal state with little or no electric field, prevents ambient light from reaching the photoconductor 34 and thereby generating cross-talk or noise.

Figure 30:
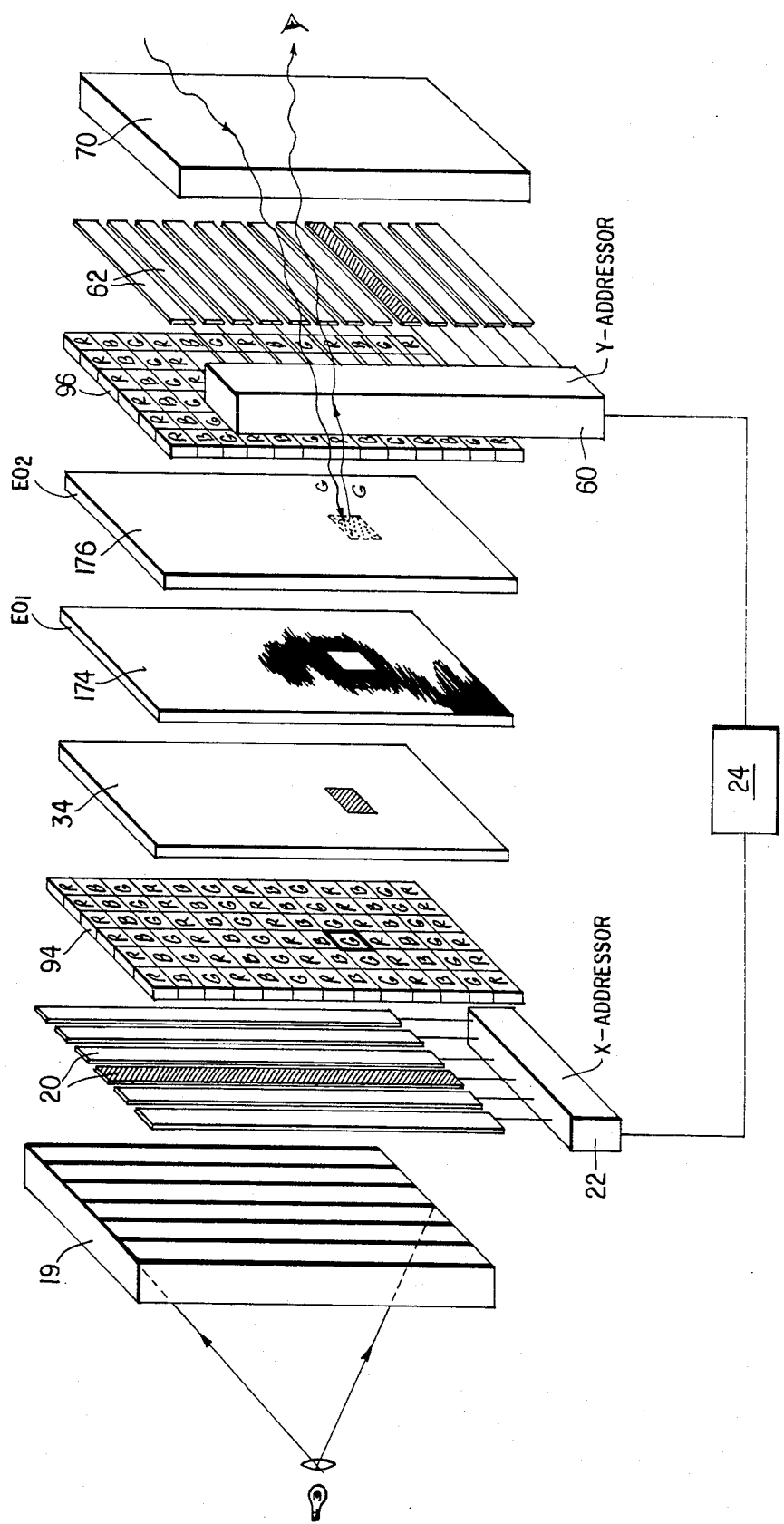
FIG. 30 is a view of the device of FIG. 29 and illustrates the series viewing mode.
Figure 31:
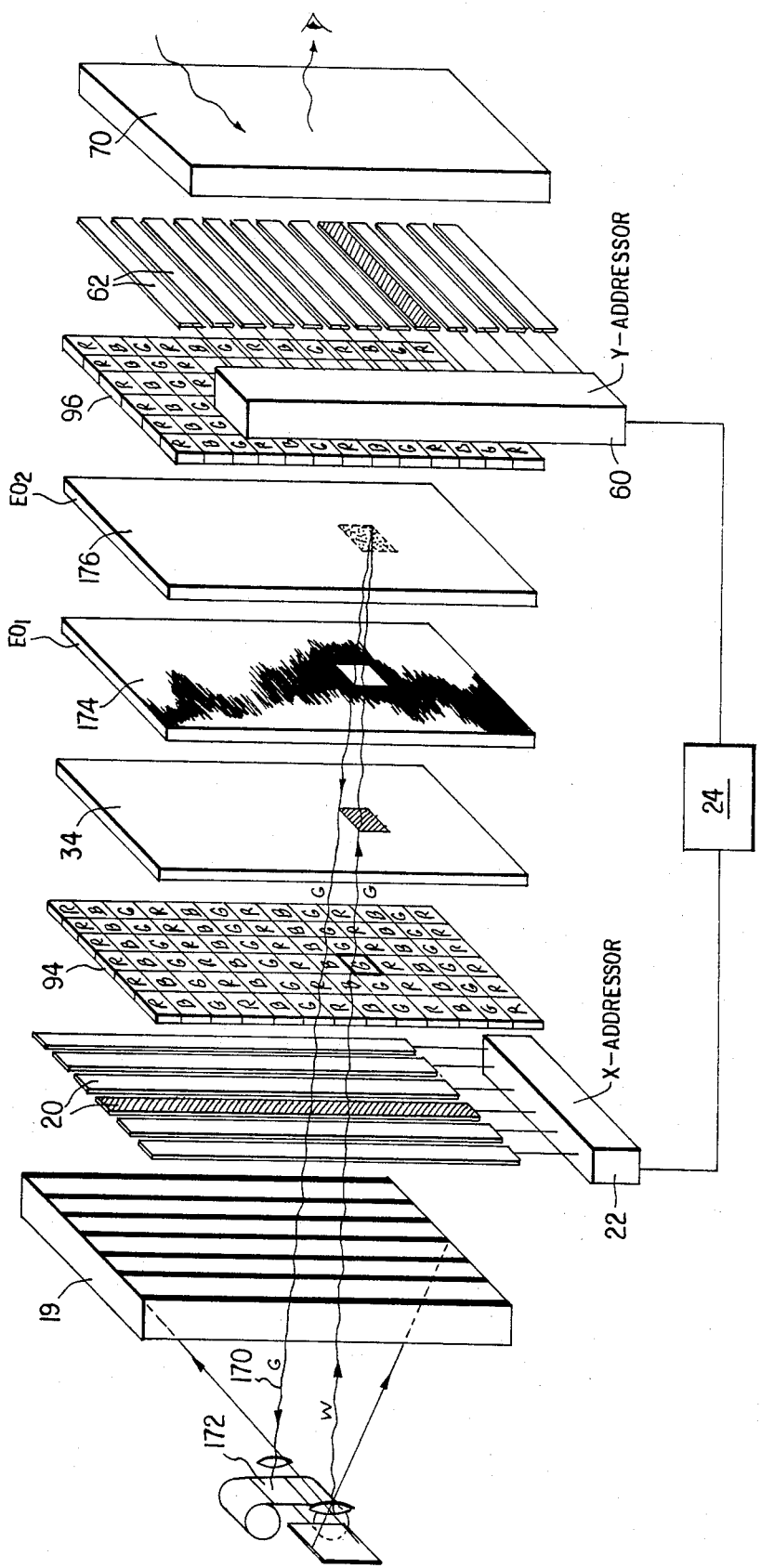
FIG. 31 is a view of the apparatus shown at FIG. 29 and illustrates the serial recording mode.

Referring now to FIG. 30, the vertical grid pattern of white light is magnified and projected onto a photoconductor layer 34 after having passed through lattice filter array 94. So long as there are no activating electric fields applied to the vertical and horizontal addressor strips, then electro-optic sheet 174 is opaque and electro-optic sheet 176 is clear. In this condition, the observer will see black. If now an electrical potential is applied to a portion of photoconductor 34 such as by two of the cross-addressor strips, then a region thereof is activated and the first electro-optic sheet 174 will change its color state from clear to scattering, for example. Hence, a color spot will be seen by the viewer. By successively addressing in the correct sequence, the X and Y addressors will generate an entire frame.

Referring now to FIG. 31, again a vertical grid of light is applied to photoconductor 34. When the vertical and horizontal strips are time addressed, pair-wise, electro-optic sheet 174 changes locally from opaque to clear. A corresponding color, for example, green, will now pass to second electro-optic sheet 176 which is now changed from clear to scattering (or from clear to green if colored electro-optic cells exist) and accordingly green light is scattered back through the clear electro-optic sheet 174 for recordation of film 172.

Figure 32:
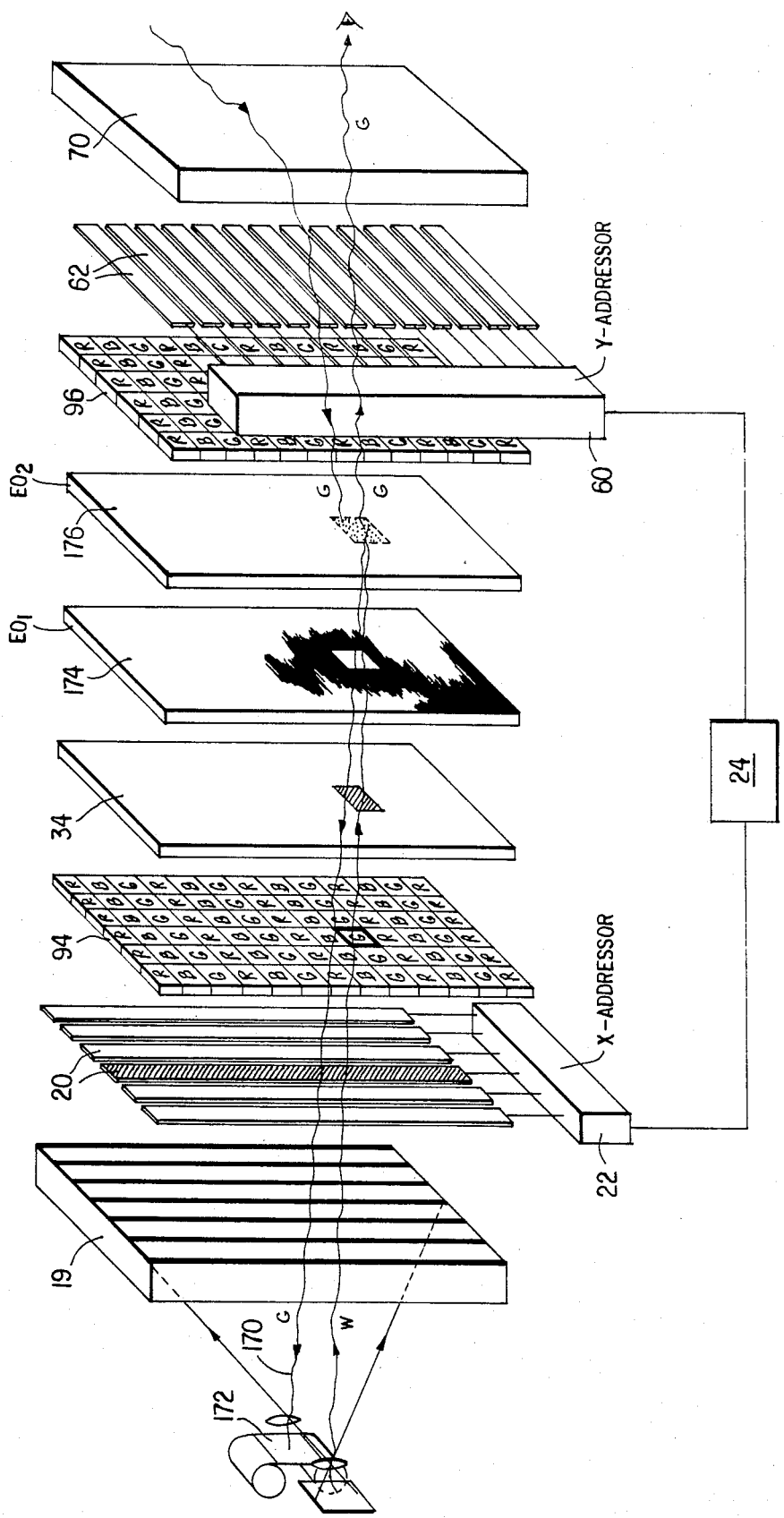
FIG. 32 is a view of the device shown at FIG. 29 and illustrates the series viewing mode operating simultaneously with the series recording mode.

Referring now to FIG. 32, strong ambient light is used for both recording and viewing time sequential information. When the two illustrated addressor strips are activated, the fist electro-optic sheet 174 changes from opaque to clear and the second electro-optic sheet 176 changes its optical state from clear to, for example, a scattering state. A portion of the green light is scattered forward onto virgin film 172 while the back scattered portion passes through green filter to be seen as a green spot.

Figure 33:
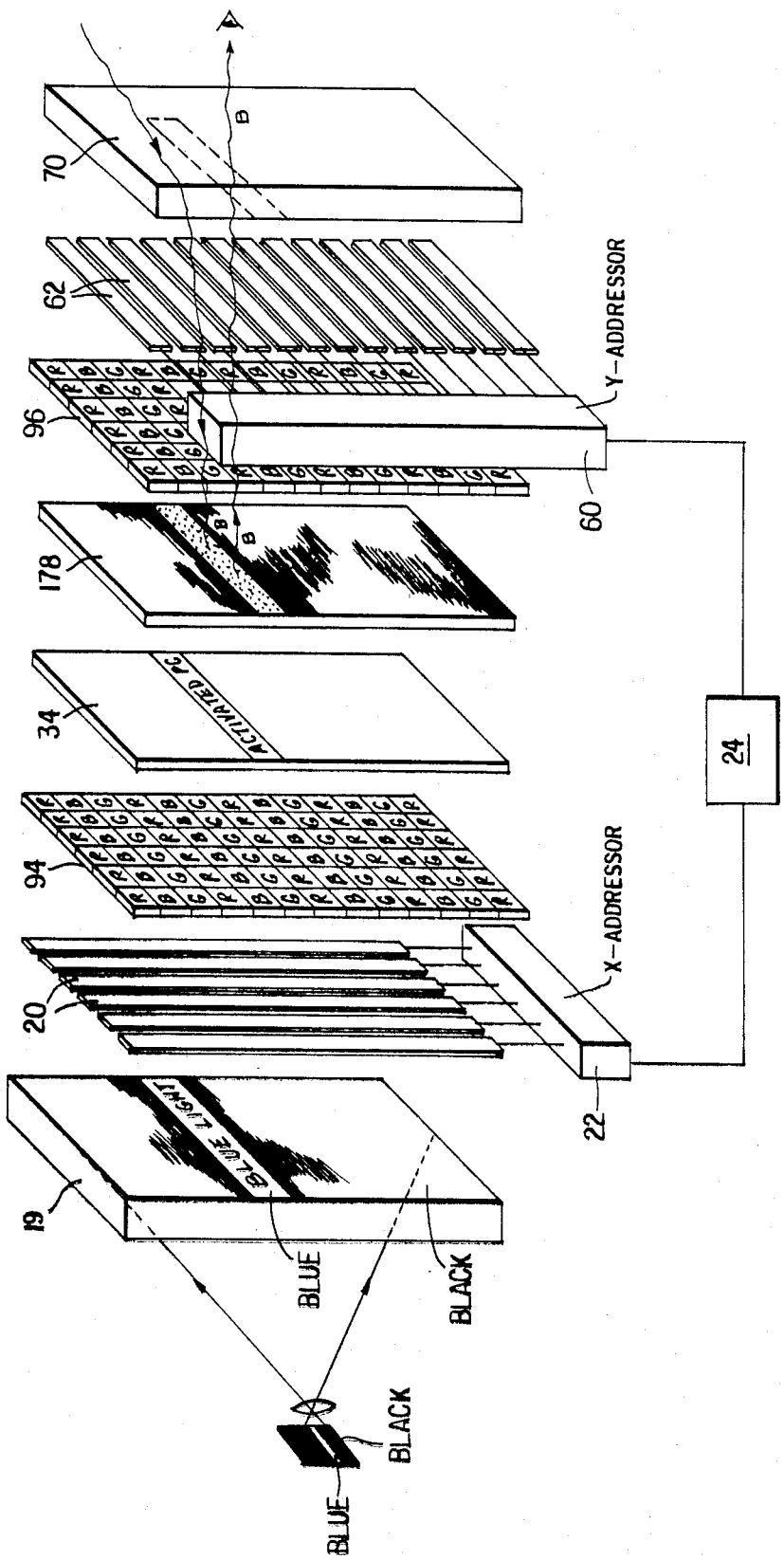
FIG. 33 is a schematic view of another color display light amplification apparatus capable of series and parallel viewing, of series recording and of simultaneous serial recording and viewing, the apparatus shown in the parallel viewing mode.

Referring now to FIG. 33, another embodiment of a compact viewer is illustrated. Either the photoconductor layer 34 or electro-optic sheet 178 or both can be in gravure lattice array, if desired. The electro-optic sheet 178 is such that in the off state it is opaque. When weak colored information light is incident on the color gravure array 94, only those colors reach the photoconductor 34 which will pass through the color filters. Assume, for example, that information in the form of a blue strip is present. It will pass through the blue filters but not through the red and green filters. Accordingly, where blue light is incident on the regions of the blue filters, the electro-optic sheet 178 changes its color state from opaque to scattering. The color state is such as to scatter ambient light back to the eye of the observer through the blue filter on the ambient side. Also, some of the scattered blue light passes onto the photoconductor 34, some of which is absorbed and hence will provide a feedback mechanism to thereby beneficially increase the conductivity of the photoconductor. Hence, an observer will see a blue strip against a black background.

Figure 34:
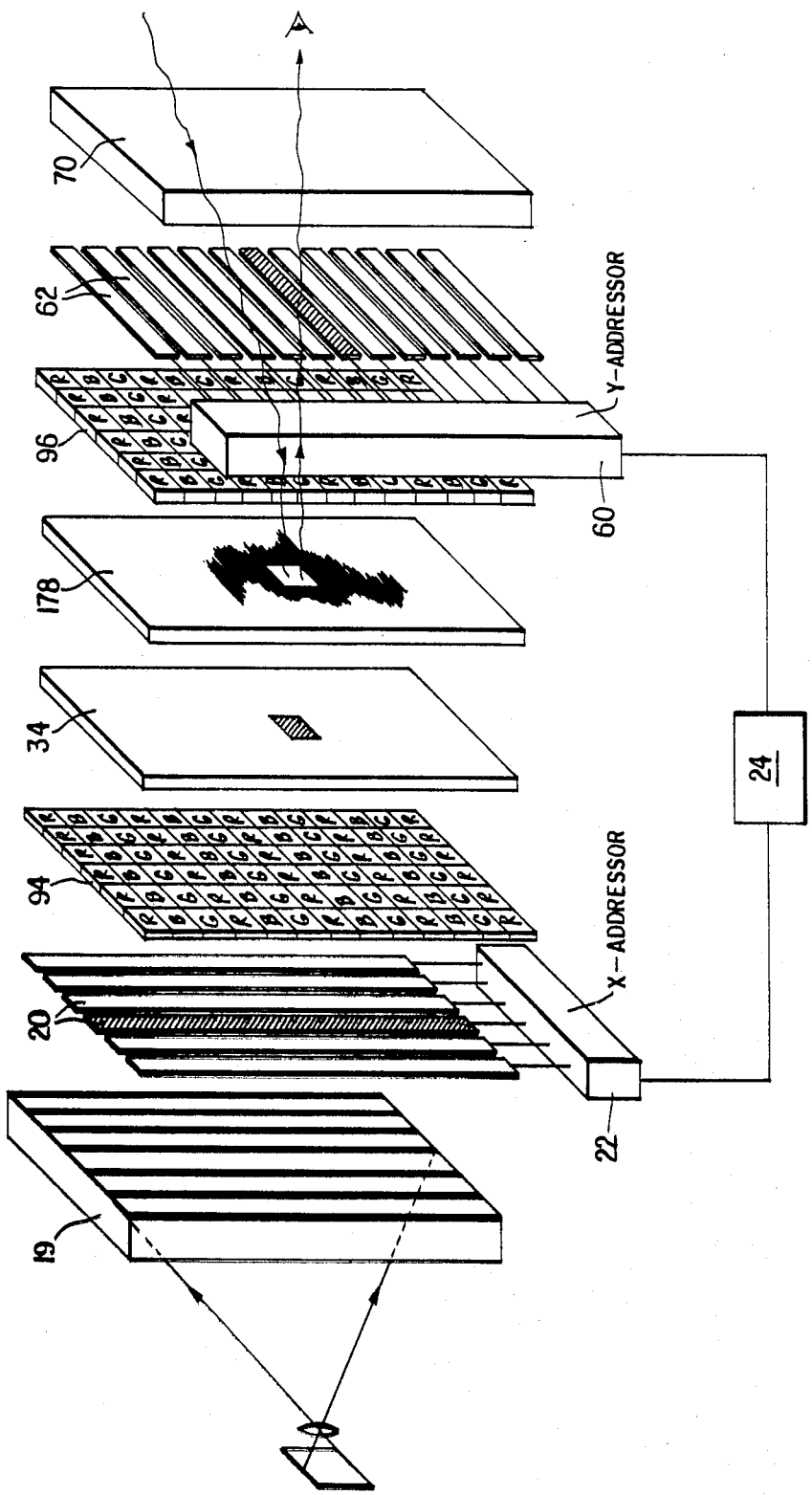
FIG. 34 is a view of the device of FIG. 33 and illustrates the series viewing mode.

Referring now to FIG. 34, a description of the apparatus at FIG. 33 will now be offered when that apparatus is used in the series viewing mode, the description of FIG. 33 having treated the parallel viewing mode of operation. White light in the form of a grid congruent with the vertical strips is projected onto photoconductor layer 34 after passing through color filters 94. If now the indicated vertical and horizontal strips are activated by voltage pulses, electro-optic sheet 178 will change from opaque to scattering. If, for example, the particular strips activated correspond to a red filter, then only red ambient light will be back scattered to the observer.

Figure 35:
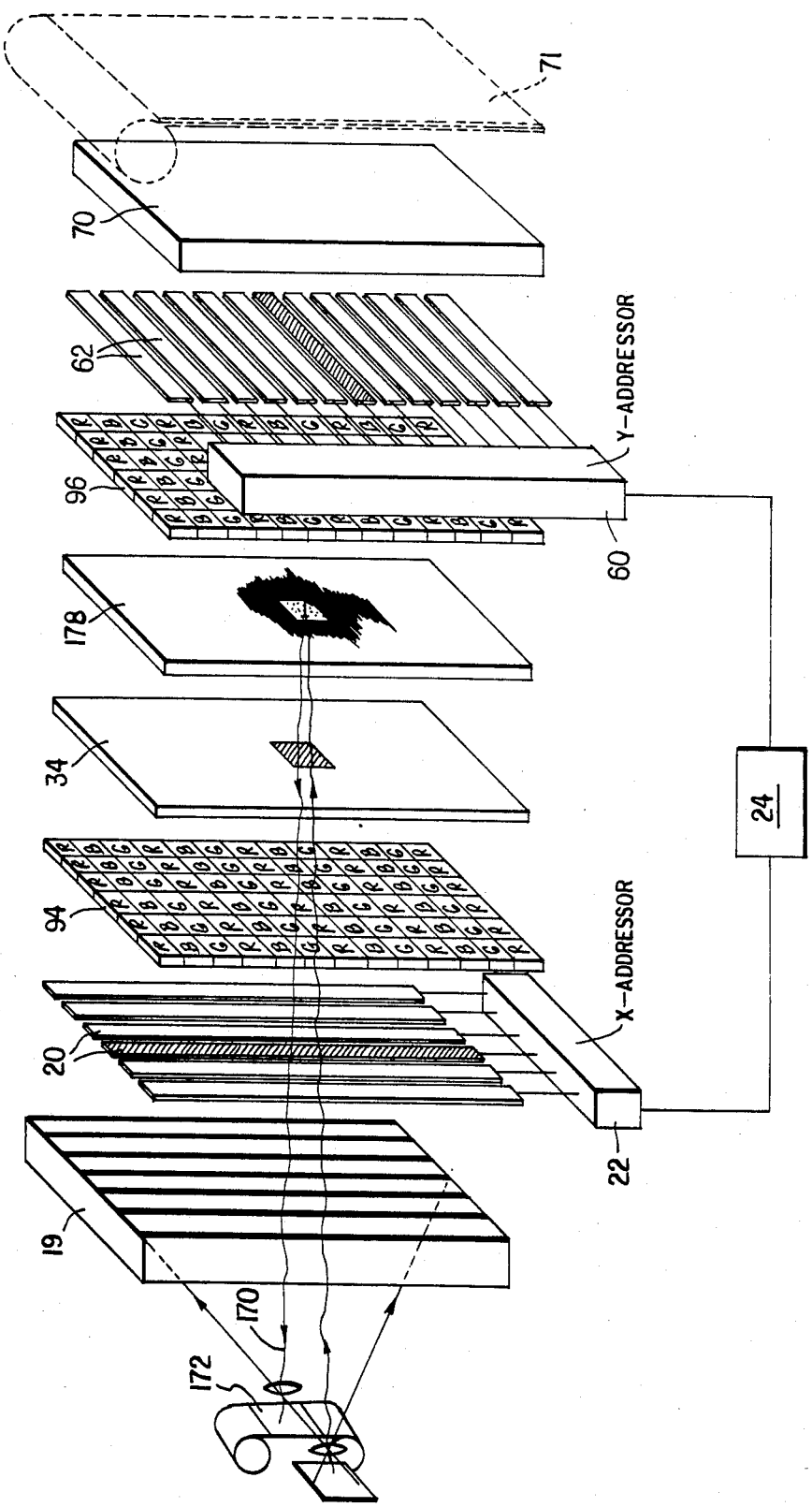
FIG. 35 is a view of the apparatus of FIG. 33 when operating in the series recording mode.

Referring now to FIG. 35, a time sequential recording mode will now be described. Again, a grid of white light passes through filter 94 and is incident on photoconductor 34. If now the indicated vertical and horizontal strips are activated by voltage pulses, electro-optic sheet 178 will locally change its color state from opaque to scattering. The recording may be carried out in the following three manners. In the first manner, the grid light having passed through the red filter is back scattered and recorded on recording medium 172. Secondly, red ambient light which can be forward scattered can be the dominant mean for recording red light. Thirdly, a combination of back scattered red grid light and forward scattered red ambient light can be used for recording. In the first manner, an opaque screen having a reflecting surface on one side can be rolled down as illustrated in phantom lines in FIG. 35 by the numeral 71.

Figure 36:
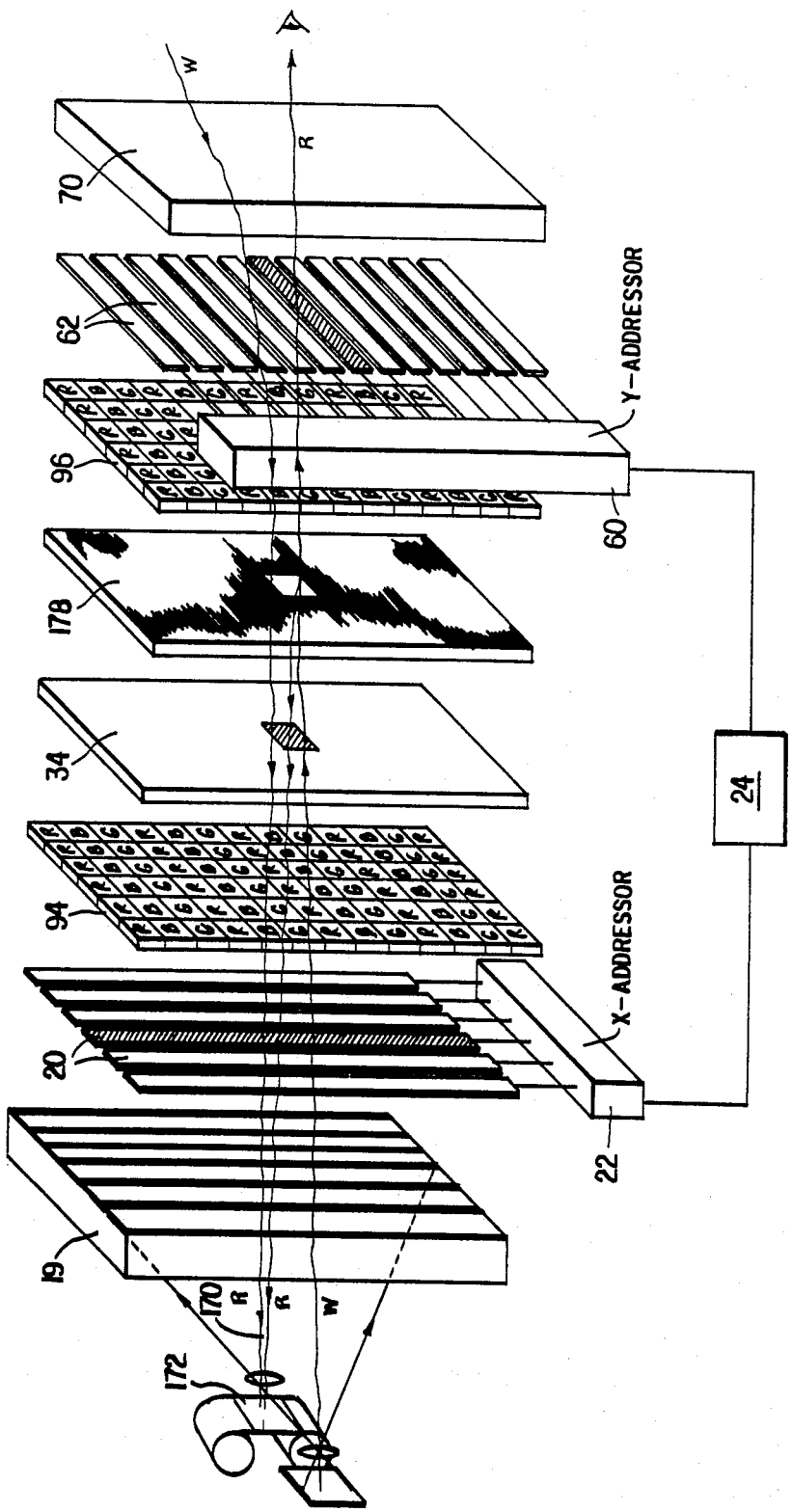
FIG. 36 is a view of the device of FIG. 33 when operated in the simultaneous series viewing and series recording mode.

Referring now to FIG. 36, the mode of operation for simultaneous time sequential color recording and viewing will now be described. Again, a grid of white light is projected from a weak light source. If the indicated vertical and horizontal strips are each activated by a voltage pulse, the optical state of electro-optic sheet 178 will locally change from opaque to a color state which allows both ambient light and grid light to be both back scattered or emitted and forward scattered or emitted as well. Then red light, for example, at the indicated position will both be recorded on the recording medium 172 and will also be seen by the eye of the observer. Thus, in this mode, both the forward and backward scattered or emitted red light is utilized.

Figure 37:
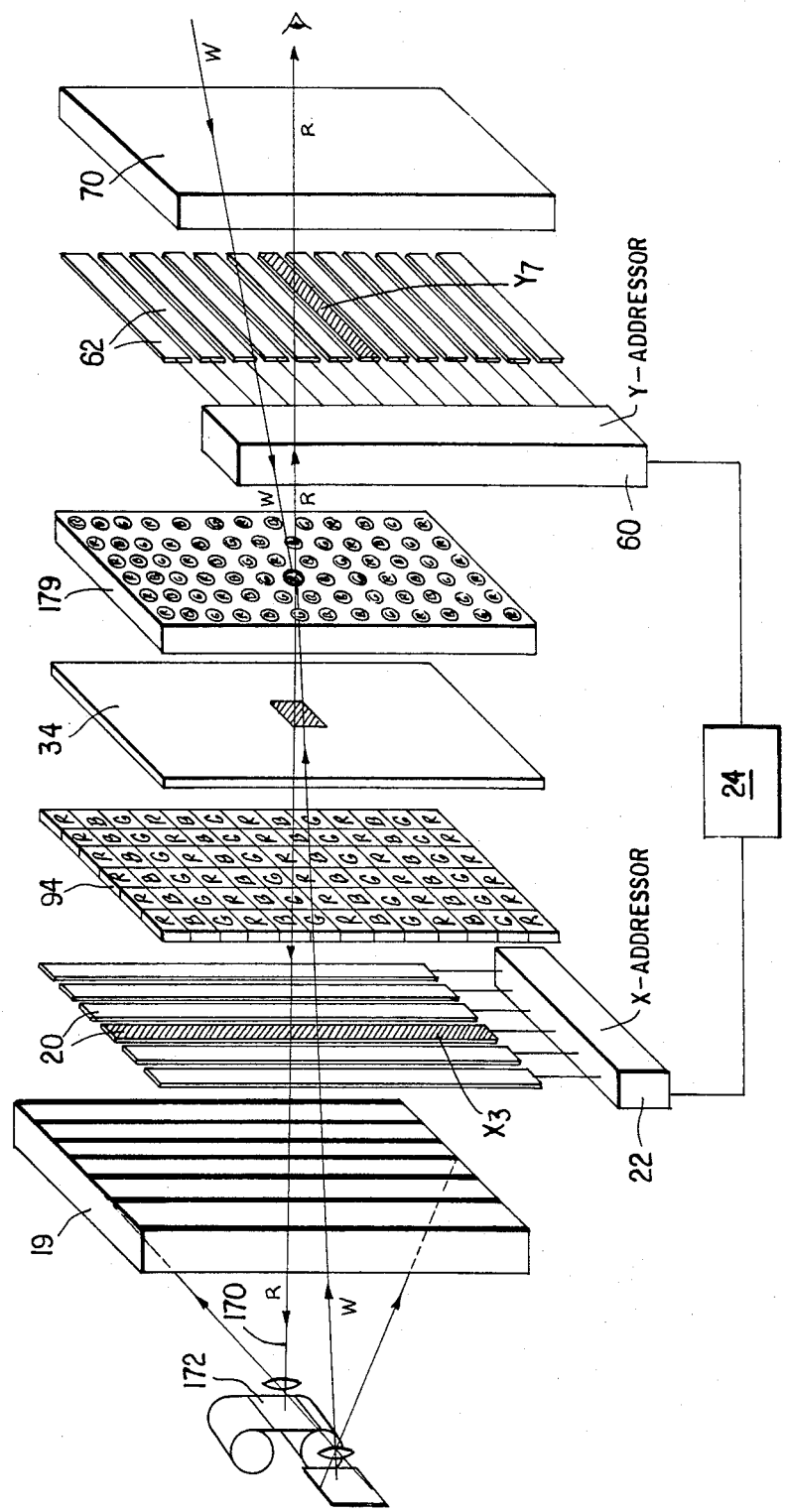
FIG. 37 is a view of a light-amplification device for parallel and series viewing and simultaneous series recording and viewing.

Referring now to FIG. 37 of the drawings, another device is illustrated which is similar to FIGS. 33, 34, 35 and 36, but which incorporates in essence fewer layers in the display. In FIG. 37— the electro-optic medium, here shown in the form of color sensitive cells in plate 179, is opaque in the off state. However, when locally activated, each electro-optic cell will change its color state from opaque to scattering or light emitting primary color, for example, red, green or blue. These cells are, again, in optical registry with the corresponding filters of sheet 94. Clearly, all four modes of operation as with the devices of FIGS. 33 to 36 are possible. FIG. 37 illustrates the case of recording and viewing time sequential information. Assume that a television program is being picked up by X and Y addressors. This reception is conventional, i.e., the manner in which the addressors sequentially energize the vertical and the horizontal strips. Assume that a particular instant of time, the serial bit of information transmitted is such that conductive strip $x_3$ of the X addressor is energized, along with conductor $Y_7$ of the Y addressor. Assume that for this strip pair a red element (a red electro-optical cell) is energized. Upon this event, light is scattered both forwardly and backwardly. The light which is scattered is red light. The observer sees, at this instant of time, a dot of red light on the viewing screen. Simultaneously, the light travelling from the electro-optic red cell travels rearwardly to the recording apparatus where virgin film is activated by this red dot of light. The other modes of operation are believed apparent.

Figure 39:
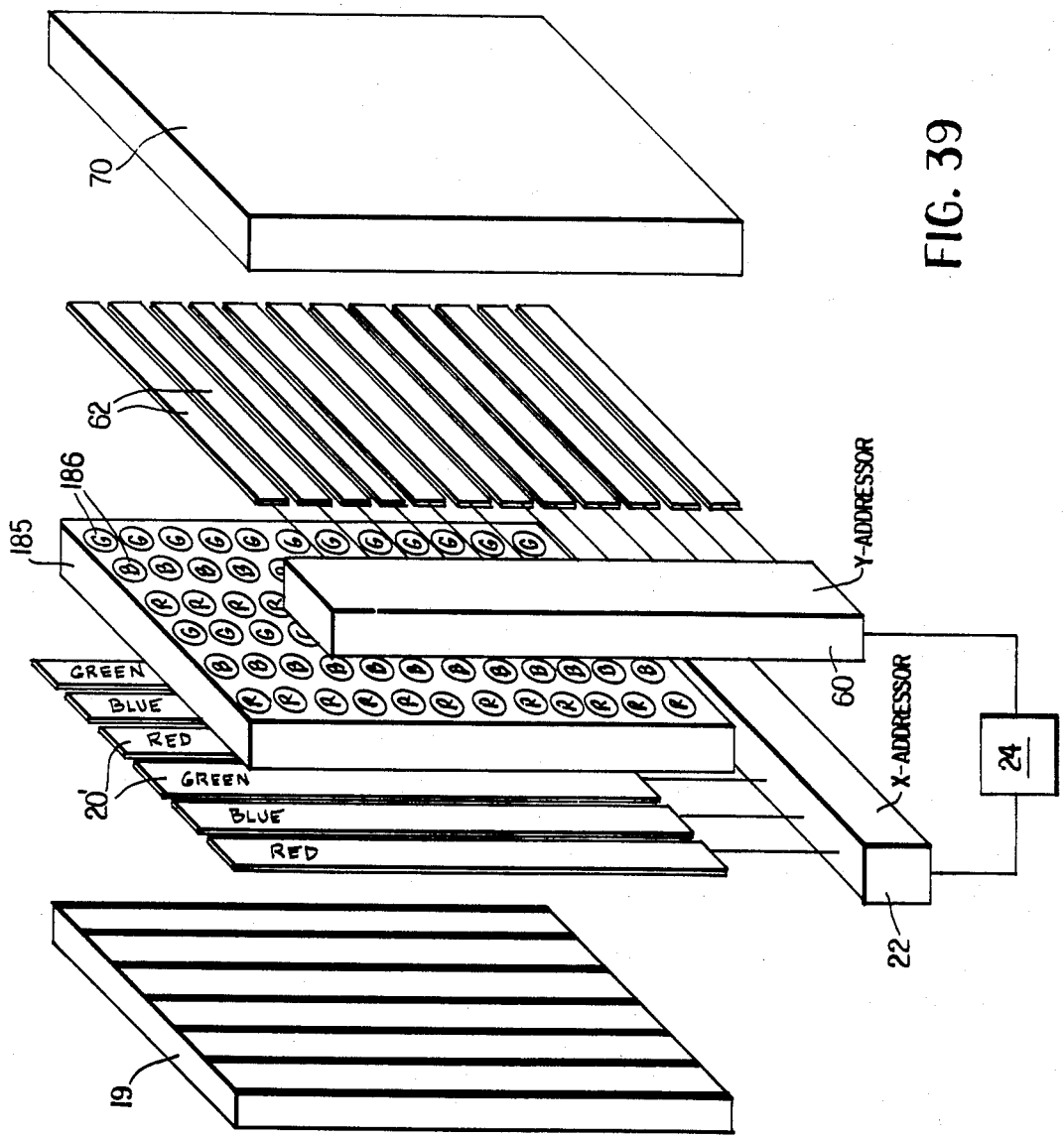
FIG. 39 is a partially schematic view of a parallel and series viewer and also for simultaneous series viewing and recording.

Referring now to FIG. 39 of the drawings, a device is illustrated which is similar to the device of FIG. 37 and again performs the same four functions illustrated at FIGS. 33 to 36. Here, however, the transparent conductors on the lefthand or weak light side themselves are color filters. Thus, transparent conductors 20 of X addressor 22 are here denoted by numeral 20' and are of the indicated colors. This can be achieved by the use of dyes. The advantage of such a construction is that one less layer is required and that registry of the color filters on the left side is no longer a problem.

Figure 38:
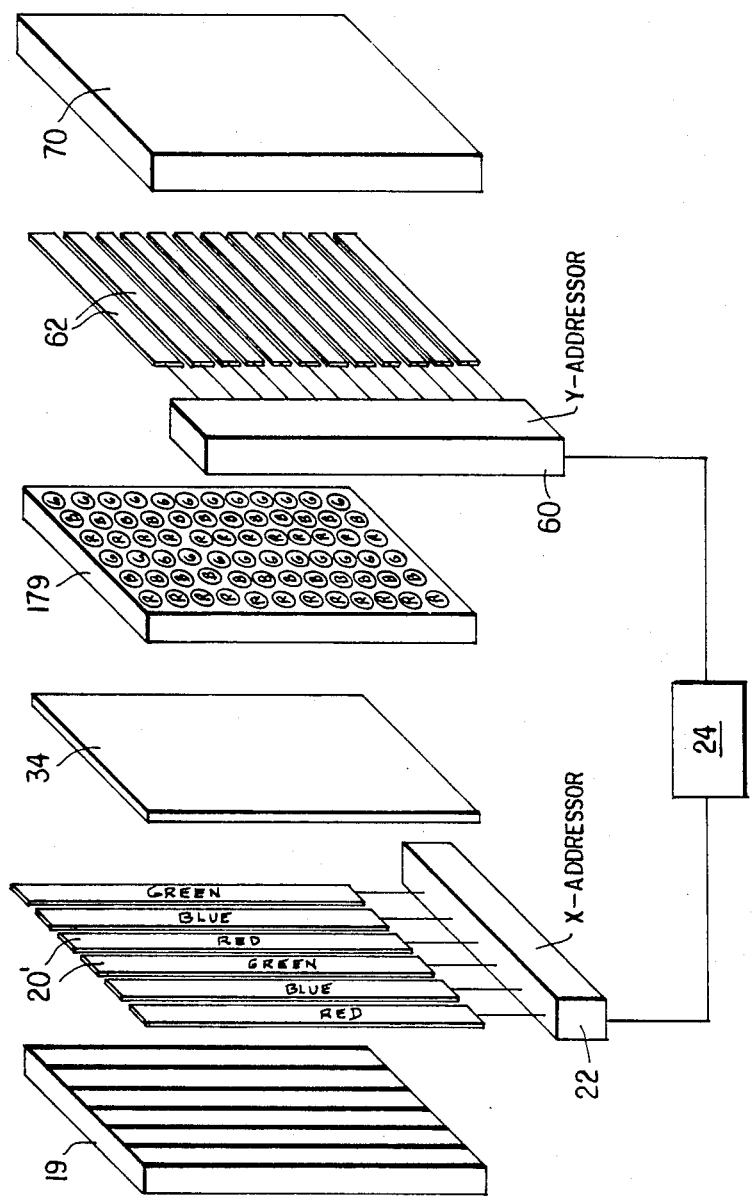
FIG. 38 is a partially schematic view of a light amplifier for parallel and series viewing and for simultaneously recording.

Referring now to FIG. 39, a compact light display and amplification apparatus is illustrated which also performs the four modes of operation previously described with respect to FIGS. 33 to 36. Again, as in FIG. 38, the vertical X addressor strips are colored and are denoted by the numeral 20'. The numeral 185 denotes a plate having indicated cavities 186 therein, the cavities carrying not only the electro-optic medium, but also the photoconductor medium. Accordingly, this construction enjoys a minimum of layers, namely, two supporting transparent sheets with three layers therebetween. Such a compact display apparatus enjoys the four modes previously described.

Figure 40:
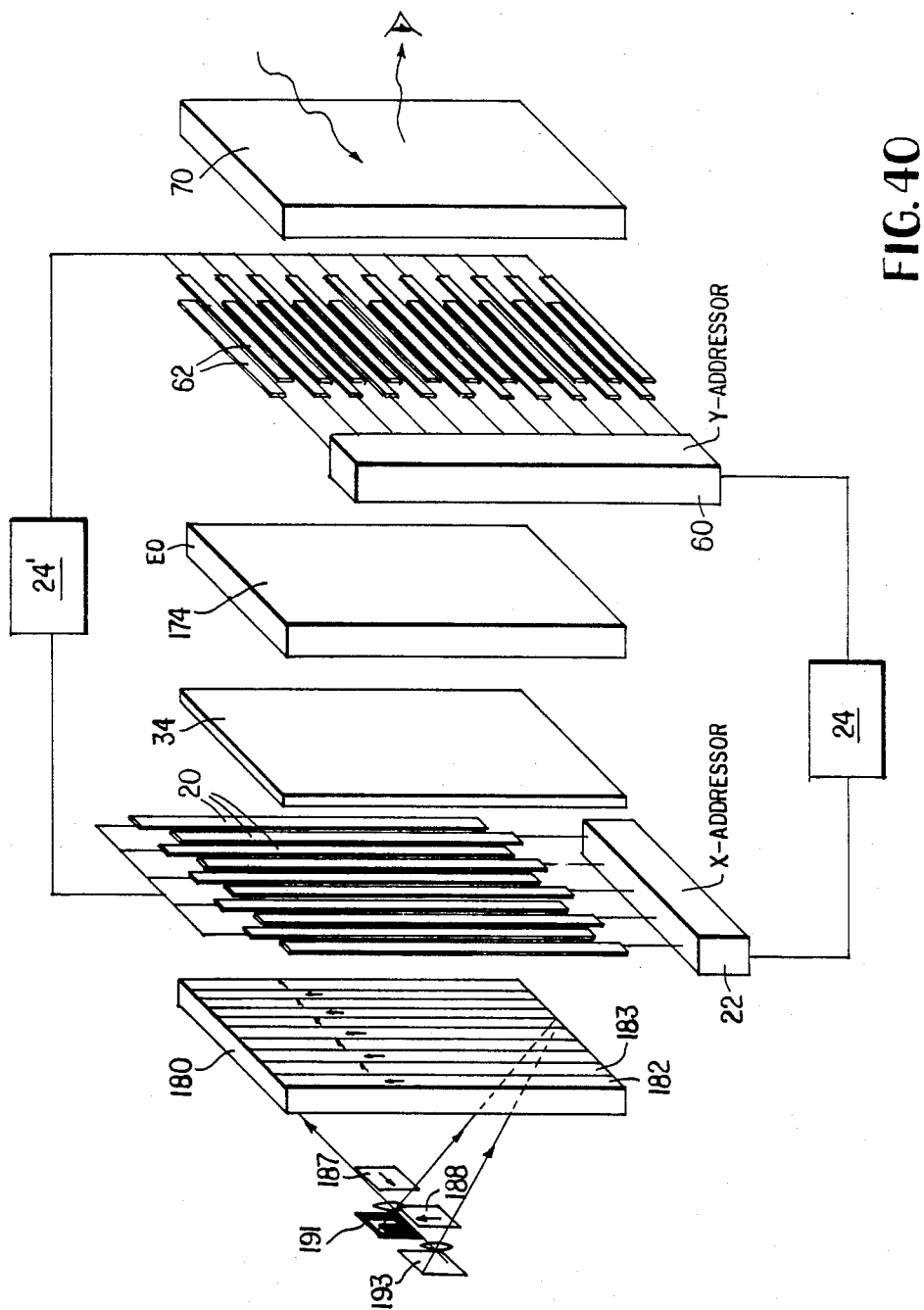
FIG. 40 is another embodiment of a parallel and series viewer for simultaneously operating in the series and parallel modes.

Referring now to FIG. 40 of the drawings, an embodiment is illustrated which is capable of the simultaneous presentation of parallel information as well as time sequential information. Thus, the device may exhibit stationary text material and a motion picture to accompany such material. Or, a stationary picture may be exhibited with changing text material. The general construction previously described is not appreciably changed. The illumination of the photoconductor and of the addressors must, however, be time interlaced. This is analogous to multiplexing and involves the following steps. First, parallel information such as a picture is projected for a length of time of duration delta $T_1$, during which the vertical and horizontal addressor strips have unchanging electric potentials. Thereafter, the picture is switched off and X and Y addressors are sequenced over a time interval of delta $T_2$. This second interval defines a complete frame (image) for the series operation. At the end of these two time periods, the picture is again presented. This process continues during the entire presentation. Such a method of presenting both parallel and time sequential information has the advantage of utilizing the structures previously described. It requires the proper switching on and off by both the X and Y addressors and the grid light. The number of frames per second, N, in the combination of parallel and time sequential modes is given by the expression $N = 1/(\text{Delta } T_1 + \text{Delta } T_2)$ and must be sufficiently great so as to eliminate flicker.

At FIG. 40, two sets of addressors are required, the second set being coupled to a voltage supply 24'. Numeral 180 indicates a polarizing plate having strips 182 which vertically polarize light and alternating strips 184 which horizontally polarize light.

Figure 41:
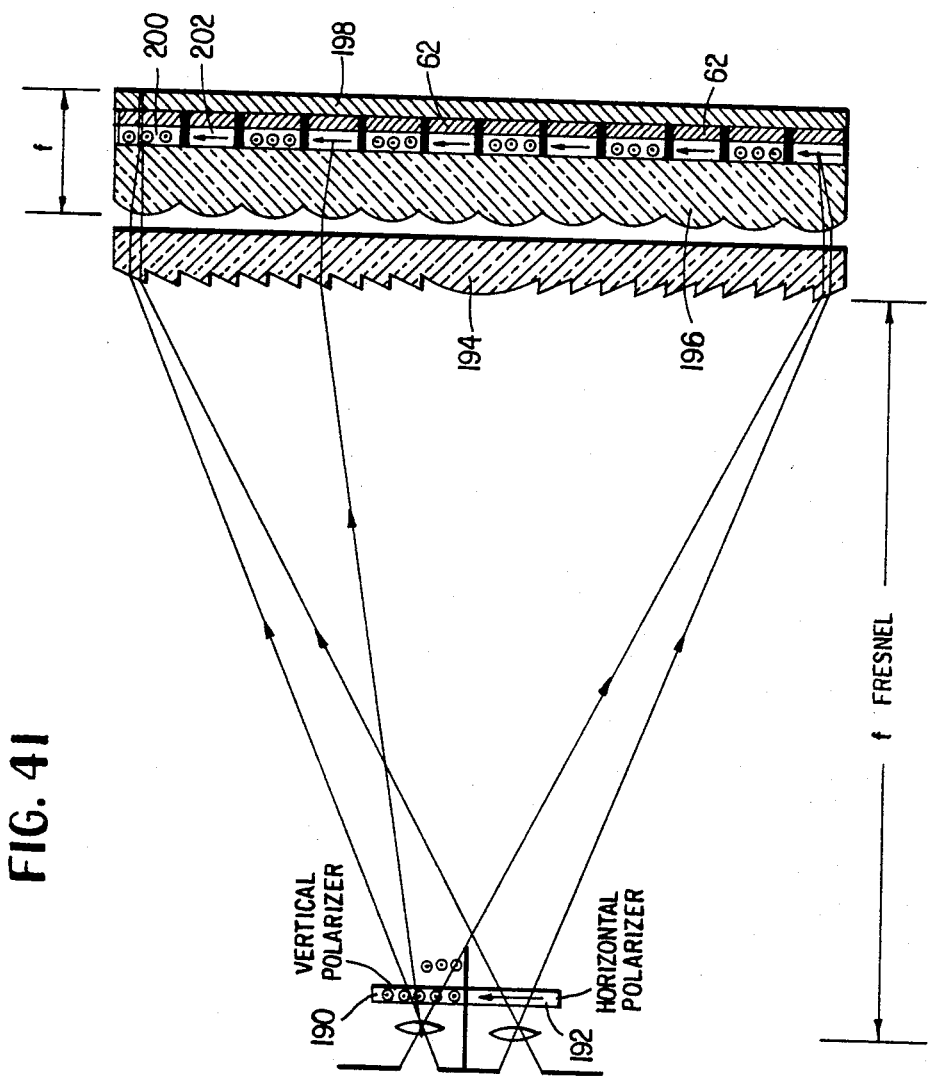
FIG. 41 is a partially schematic cross-sectional view of the illumination system of the device of FIG. 40.

One method for separating information carried by two light cones is shown at FIG. 41. One cone of light passes through a vertical polarizer 190 while another cone passes through a horizontal polarizer 192. A Fresnel lens 194 having a focal length equal to the distance between the projection lenses and the viewing screen is positioned rearwardly of the light amplifier screen. The projected light is made parallel by the Fresnel lens. A set of contiguous cylindrical lenses on lenticular plate 196 equal in number to the total number of vertical strips for both X addressor and parallel viewing strips, follows the Fresnel lens. The focal lengths of the cylindrical lenses of plate 196 are such that parallel light is focused on photoconductor sheet 198. The front side of the X addressor lenses carry polarizing strips 200 and vertical polarizing strips 202. When the light cone bearing the parallel information is projected clearly only the corresponding photoconductor sheet domains will be activated. The series operation will be decoupled with no cross-talk from the parallel operation.

Figure 42:
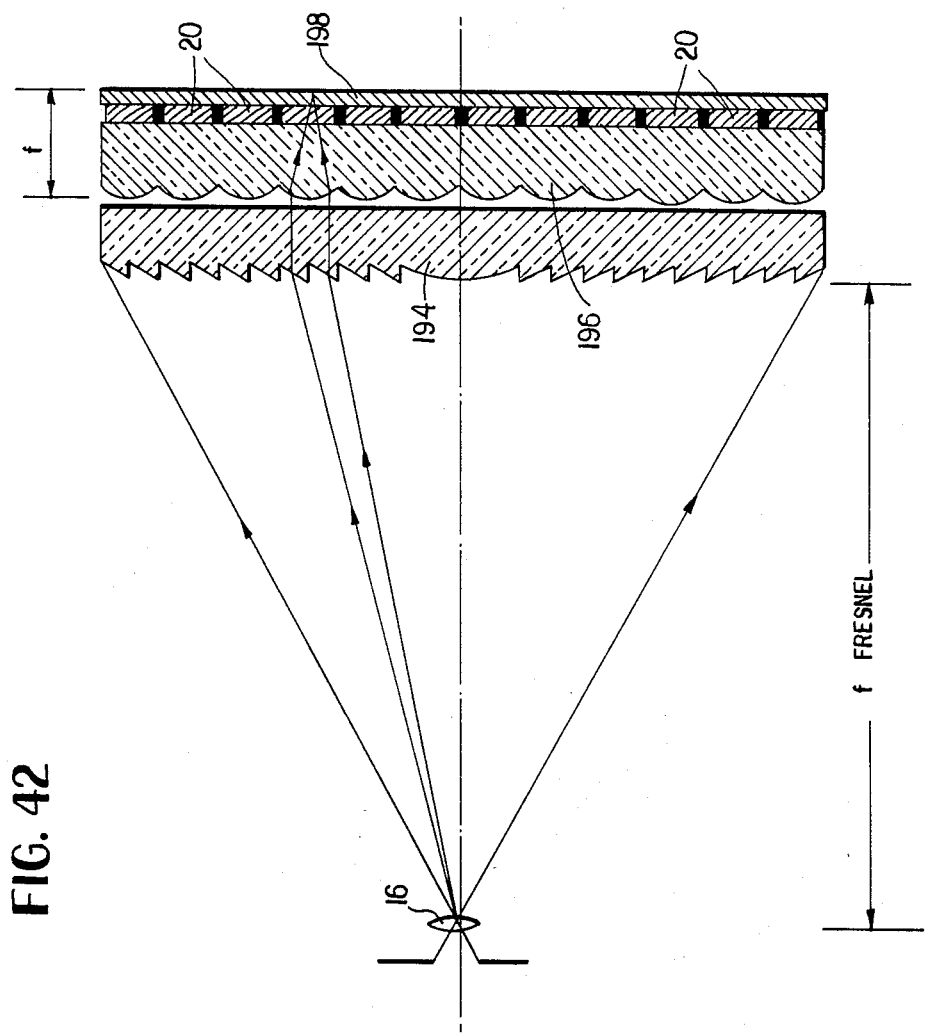
FIG. 42 is a partially schematic cross-sectional view illustrating a method of making a light grid.

Referring now to FIG. 42 of the drawings, a method of making the light grid 19 used in many of the embodiments is illustrated. The light grid which is projected must be in registry with the X addressing strips as well as with the various color cells of the previously described embodiments. In FIG. 42, a cone of light from a lens 16 is incident on Fresnel lens 194 whose focal length f is equal to the distance between itself and lens 16. The resultant parallel light now falls upon cylindrical lenses carried by lenticular plate 196 whose number of lenses is equal to the number of X addressing strips. These lenses are in registry with the strips 20 and are contiguous with respect to each other so that they collect the maximum amount of light. For example, if there are 100 vertical strips 20 to the inch, there will be 100 vertical cylindrical lenses on lenticular lens plate 196 to the inch in registry with the cylinders. Because the art of molding such lenticular cylindrical lenses is well known, an inexpensive method for fabricating a grid of conducting lines on a photoconductor is possible.

Figure 43:
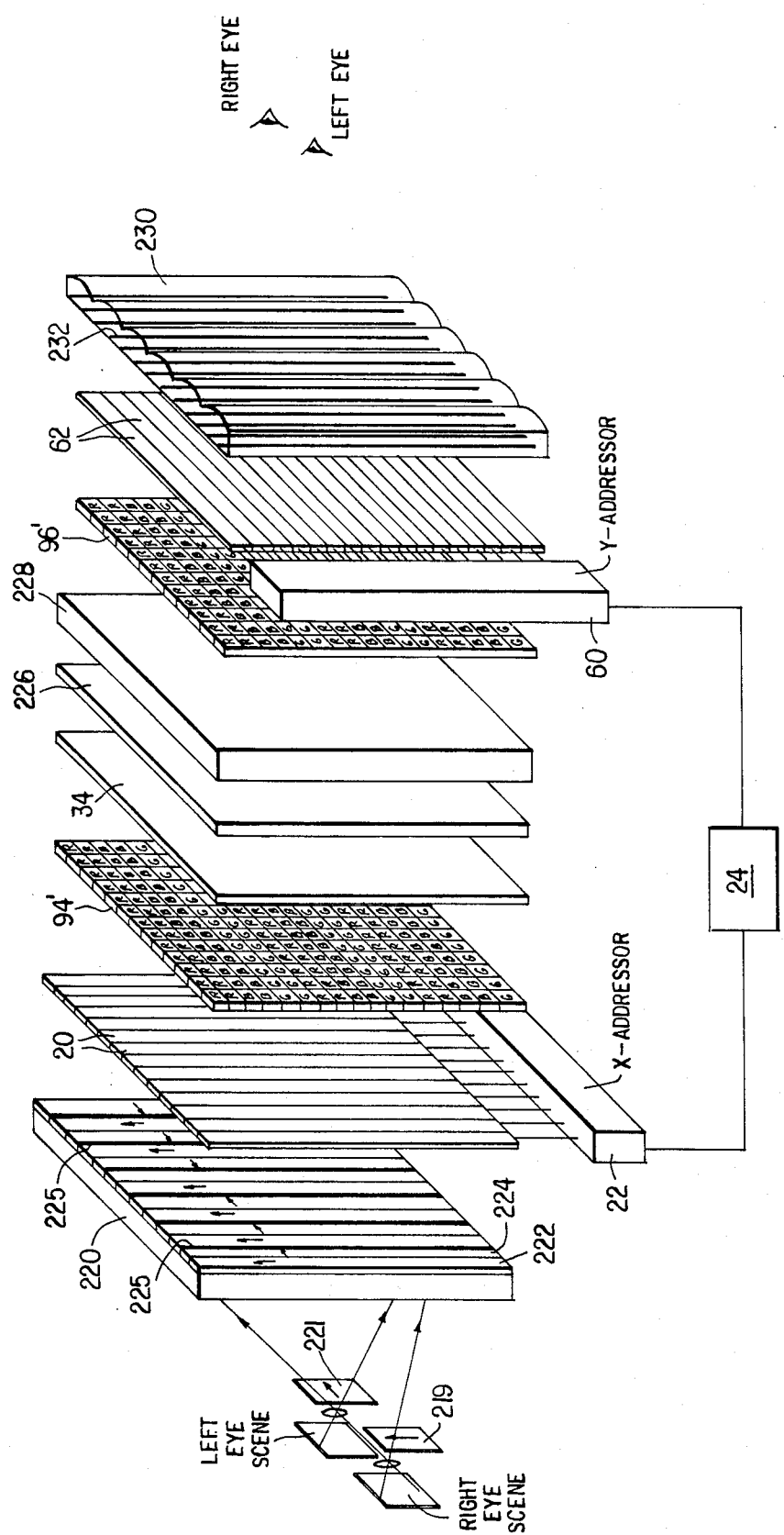
FIG. 43 is a partially schematic view illustrating a three-dimensional color viewer and is shown for viewing information in the parallel mode.

Referring now to FIG. 43 of the drawings, an optical apparatus for presenting three dimensional motion picutres and series information is given. Projections from two frames, one for the left eye and one for the right eye, pass through two polarizing elements 219 and 221 polarizing light in the indicated directions. These images are projected on photoconductor sheet 34 after passing through vertical polarizing strips 222 and horizontal polarizing strips 224 of plate polarizer 220. Opaque masking strips 225 are of such a width as to correspond to blind regions which the right and left eye perceives on the viewing side of lenticular lens plate 230. The primary color filter plates 94' and 96' are similar to those previously denoted by the numerals 94 and 96, respectively, except that the filters of the former are double in number because one filter set accommodates one eye and the other filter set the other eye. Numeral 226 denotes an opaque white scattering plate and numeral 228 indicates an electro-optic sheet whose color state is changed when subject to an electric field thereacross. For example, the change is from clear to scattering. Masking strips 232 on lenticular cylindrical lens plate 230 are optically aligned with corresponding opaque strips 225 on polarizing plate 220. In viewing color information, such as motion pictures, the transparent X addressor strips 20 have the same electric potential, as do the horizontal addressor strips 62 (but different from strips 20). Thus, FIG. 43 illustrates the device in the parallel viewing mode.

Figure 44:
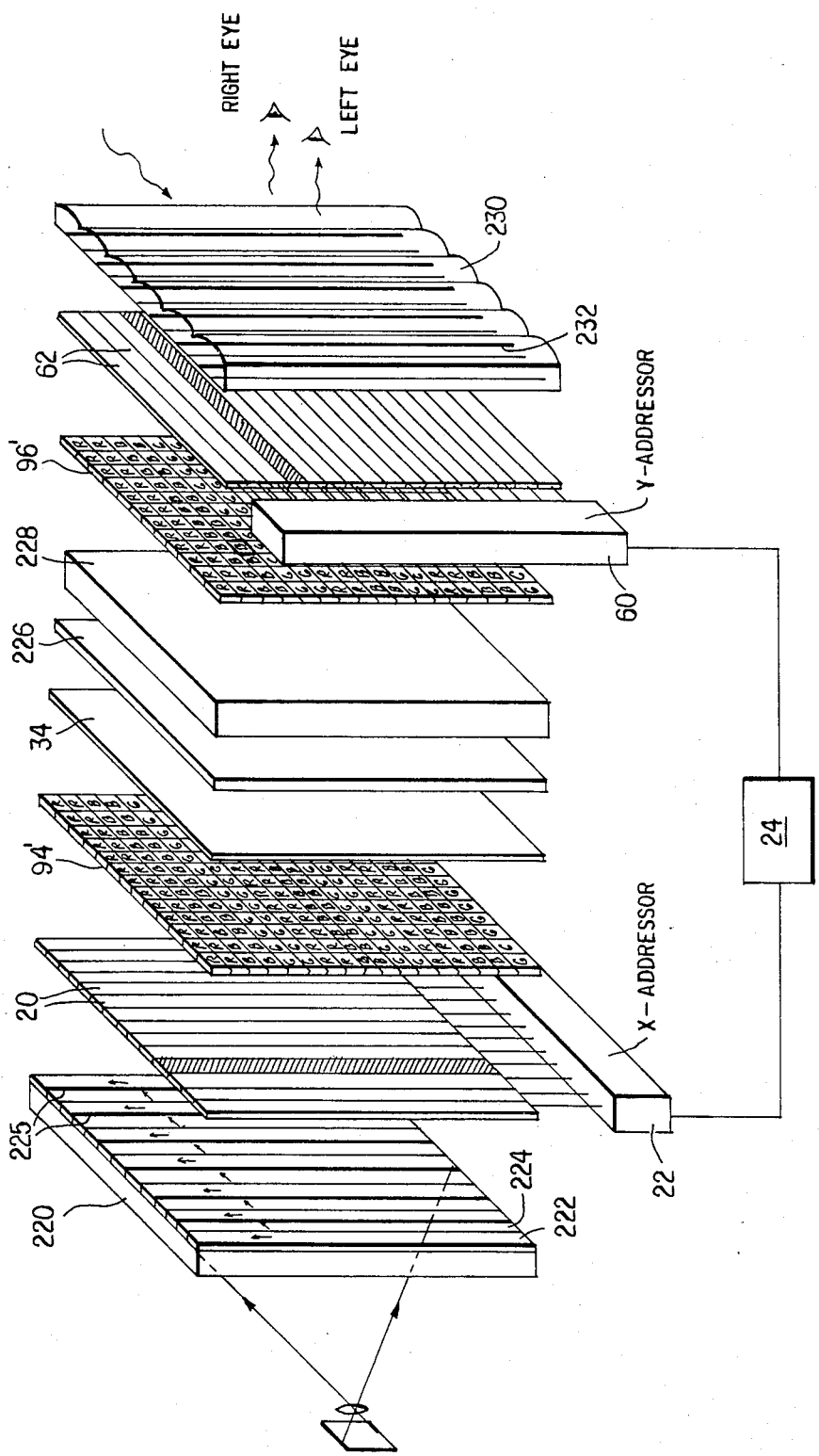
FIG. 44 is a view similar to FIG. 43 but illustrates viewing in the series mode.

FIG. 44 illustrates the mode of operation of the apparatus of FIG. 43 but in a time sequential mode, as for exhibiting three dimensional color motion pictures. White light is projected onto the polarizing grid 220. The X and Y addressor strips are subject to time varying voltages. For the indicated (shaded) addressor strips, a particular region of electro-optic sheet 228 is energized to a different color state. If this region corresponds to the left eye, the left eye will set it. If it corresponds to the right eye, the right eye will see it.

What is claimed is:

1. An electro-optic device of the type having a photoconductive sheet and an electro-optic sheet both generally planar, the improvement comprising, generally planar X and Y sets of transparent and conductive addressor strips, the X and Y sets sandwiching the photoconductive sheet and the electro-optic sheet.

2. The device of claim 1 including means for illuminating the X addressor strips from a direction exteriorly of the sandwich towards the sandwich and into the plane of the X addressor strips.

3. The device of claim 2 wherein said illuminating means does not illuminate the interstices between the X addressor strips.

4. The device of claim 1 wherein the photoconductive sheet is in the form of a rectangular array of discrete photoconductive elements, the columns of the array being aligned with the X addressor strips.

5. The device of claim 4 wherein the discrete photoconductive elements respond to different colors, and including a reflecting sheet positioned between the photoconductive sheet and the electro-optic sheet.

6. The device of claim 4 wherein the discrete photoconductive elements respond to different colors, and including a generally rectangular array of electrically conducting rods mirrored at their ends which face the electro-optic medium.

7. The device of claim 1 wherein the electro-optic sheet is in the form of a rectangular array of discrete electro-optic elements, the columns of the array being aligned with the X addressor strips.

8. The device of claim 7 wherein the electro-optic elements are normally opaque and changing to a scattering color state when impressed with an electric field, and wherein the X addressor strips are themselves color filters of different colors.

9. The device of claim 1 including means for defining a gravure lattice array of points of rectangular form, said means defined by an array of electrically conducting cylinders, each column of the gravure array being aligned with an X addressor strip.

10. The device of claim 1 including an opaque sheet positioned between the photoconductive sheet and the electro-optic sheet, the opaque sheet precluding ambient light from passing through the electro-optic sheet to the photoconductive sheet.

11. The device of claim 10 including a second electro-optic sheet, said second electro-optic sheet being normally clear, and positioned adjacent and parallel to the X addressor strips on the side thereof remote from the photoconductive sheet, and also including a second set of Y addressor strips being parallel to and on the side of the second electro-optic sheet remote from the X addressor strips.

12. The device of claim 11 including a first and a second generally rectangular array of aligned color filters, the first color array positioned next to the one Y addressor set of strips and the second color array positioned next to the other Y addressor set of strips.

13. The device of claim 1 including a second electro-optic sheet next and parallel to said first-mentioned electro-optic sheet, one of said electro-optic sheets being normally opaque and becoming clear when impressed with an electric field, the other electro-optic sheet being normally clear and assuming a color when impressed with an electric field.

14. The device of claim 13 including means for photographically recording light, said means positioned on the side of the X addressor strips remote from the electro-optic sheets.

15. The device of claim 13 including a first and a second generally rectangular array of aligned color filters, the first color array positioned next to one Y addressor set of strips and the second color array positioned next to the X addressor set of strips.

16. The device of claim 1 wherein the electro-optic sheet is normally opaque and becomes clear when impressed with an electric field.

17. The device of claim 16 including a first and a second generally rectangular array of aligned color filters, the first color array positioned next to one Y addressor set of strips and the second color array positioned next to the X addressor set of strips.

18. The device of claim 1 including a first generally planar rectangular array of color filters positioned next to the X addressor strips.

19. The device of claim 18 including a second generally planar rectangular array of color filters, said second color filter array positioned next to the Y addressor strips, the individual color filters of the first and second color filter arrays being correspondingly optically aligned.

20. The device of claim 19 including a rectangular array of conductors positioned between the photoconductive sheet and the electro-optic sheet, each conductor of the conductor array being aligned with and sandwiched by a pair of color filters of said first and second color filter groups, the ends of the conductors which face the electro-optic sheet being mirrored to thereby reflect ambient light passing through the electro-optic sheet.

21. The device of claim 19 including an opaque, dielectric reflecting sheet positioned between the photoconductive sheet and the electro-optic sheet.

22. The device of claim 18 including a rectangular array of conductors positioned between the photoconductive sheet and the electro-optic sheet, the ends of the conductors which face the electro-optic sheet being mirrored in different colors, whereby ambient light passing through the electro-optic sheet and striking a mirrored conductor end is, upon reflection, of a color corresponding to the color of the mirrored conductor end which reflected it, the mirrored conductor ends being in color correspondence with the color filters.

23. The device of claim 18 including a twisted nematic crystal and light polarizer laminate positioned between the Y addressor strips and the photoconductive sheet.

24. The device of claim 23 including a generally rectangular array of conductors positioned between the photoconductor sheet and the twister nematic liquid crystal and light polarizer laminate, the ends of the conductors which face the said laminate being mirrored in different colors, the mirrored conductor ends being in color correspondence with the color filters.

25. The device of claim 18 where the electro-optic sheet is defined by a rectangular array of electro-chromic solid state colored ion domains, of different colors, and including an opaque, dielectric reflecting sheet positioned between the photoconductive sheet and the electro-optic sheet, the individual color filters of the color filter array being in color correspondence with the electro-chromic ion domains.

26. The device of claim 18 including a twisted nematic liquid crystal and light polarizer laminate positioned between the electro-optic sheet and the Y addressor strips, and including a generally rectangular array of electrical conductors mirrored at their ends which face the Y addressor strips, the conductor array positioned between the photoconductive sheet and the electro-optic sheet.

27. The device of claim 26 wherein the mirrored conductor ends are colored and are in color correspondence with the filters of the color filter array.

28. The device of claim 18 including a twisted nematic liquid crystal and light polarizer laminate positioned between the photoconductive sheet and the Y addressor strips, and including a chromatic quarter wave plate whose domains are in color correspondence with the color filters of the color filter array, the quarter wave plate located between the photoconductive sheet and the said laminate, and including chromatic liquid crystal cholesteric lattice array positioned between the photoconductive sheet and the quarter wave plate, and including an opaque sheet of dielectric material positioned between the photoconductive sheet and the chromatic cholesteric array.

29. The device of claim 18 including a generally rectangular array of electrically conducting rods positioned next to the said color filter array on the side thereof opposite to the X addressor strips, including an insulating opaque elastomer sheet next to a generally rectangular array of colored mirrors, the mirrors of which are in color correspondence with the filters of the color array, the array of colored mirrors being next to the opaque elastomer sheet, the Y addressor strips being next to the colored mirror array, the Y addressor strips being formed of conducting, transparent elastomer.

30. The device of claim 18 wherein the electro-optic sheet is in the form of a rectangular array of discrete electro-optic elements, the array being aligned with the X addressor strips, the electro-optic elements being normally opaque and changing to a scattering color state when impressed with an electric field.

31. An electro-optic device including, X and Y addressor strips which sandwich an electro-optic sheet, the X addressor strips being color filters of different colors and being conductive, the Y addressor strips being conductive and transparent, the electro-optic sheet being in the form of a rectangular array of discrete electro-optic elements which are aligned with the X addressor strips, the electro-optic discrete elements also being photoconducting, the discrete elements being normally opaque and changing to a scattering color state when impressed with an electric field.

32. An electro-optic device including, a generally planar polarizing sheet, said sheet defined by strips of alternate vertical and horizontally polarizing elements, first and second alternating sets of transparent and conductive X addressor strips, first and second alternating sets of Y addressor strips, the first X and Y sets being connected, the second X and Y addressor strips being connected, a photoconductor sheet next to an electro-optic sheet, the photoconductor and electro-optic sheets being sandwiched by said X and Y addressor strips.

33. The device of claim 32 including a lenticular lens plate whose lenses are in optical alignment with the polarizing strips of the polarizing sheet, and also including a Fresnel lens positioned adjacent the lenticular lens sheet on the side thereof remote from the X and Y addressor strips.

34. An electro-optic device including, a polarizing sheet defined by a series of alternating horizontal and vertical strips, X and Y transparent and conductive and addressor strips, a pair of generally rectangularly arrayed color filters, one color filter being positioned next to the X addressor strips, the other being positioned next to the Y addressor strips, a photoconductor sheet, a dielectric opaque scattering sheet, and electro-optic sheet, the electro-optic sheet and the photoconductor sheet sandwiching the opaque sheet, the X and Y addressors sandwiching the photoconductor sheet, the opaque sheet, and the electro-optic sheet, a lenticular lens sheet positioned next to the Y addressor strips on the side thereof remote from the X addressor strips, said lenticular sheet having spaced opaque masking lines.

* * * * *